(12) United States Patent
Parhofer et al.

(10) Patent No.: US 11,068,548 B2
(45) Date of Patent: Jul. 20, 2021

(54) COMMUNICATION SYSTEM AND METHOD

(71) Applicant: Palitree GmbH, Gräfelfing (DE)

(72) Inventors: Stefan Parhofer, Gräfelfing (DE); Christian Lind, Gräfelfing (DE)

(73) Assignee: PALITREE GMBH, Grafelfing (DE)

(*) Notice: Subject to any disclaimer, the term of this patent is extended or adjusted under 35 U.S.C. 154(b) by 0 days.

(21) Appl. No.: 16/783,370

(22) Filed: Feb. 6, 2020

(65) Prior Publication Data

US 2020/0259711 A1 Aug. 13, 2020

(30) Foreign Application Priority Data

Feb. 8, 2019 (EP) ..................................... 19156161
Oct. 21, 2019 (EP) ..................................... 19204428

(51) Int. Cl.
*G06F 16/951* (2019.01)
*H04L 12/24* (2006.01)
(Continued)

(52) U.S. Cl.
CPC ...... *G06F 16/951* (2019.01); *G06F 16/24578* (2019.01); *H04L 12/1827* (2013.01);
(Continued)

(58) Field of Classification Search
CPC . H04L 12/1827; H04L 12/1822; H04L 63/04; H04L 63/20; G06F 21/31;
(Continued)

(56) References Cited

U.S. PATENT DOCUMENTS

2006/0085253 A1 4/2006 Mengerink
2010/0198841 A1* 8/2010 Parker ................... G06F 16/951
 707/750
(Continued)

FOREIGN PATENT DOCUMENTS

| WO | 2013027971 A2 | 2/2013 |
| WO | 2016148377 A1 | 9/2016 |
| WO | 2017027206 A1 | 2/2017 |

*Primary Examiner* — Kyung H Shin
(74) *Attorney, Agent, or Firm* — Tarolli, Sundheim, Covell & Tummino LLP

(57) ABSTRACT

In a first embodiments a system for communication between at least two nodes is disclosed. The system comprises a first system accessing component that is configured to generate for a first node first node data, wherein the first node data comprises: first node identification data and first node network data comprising a node proximity with each of at least one third nodes directly connected with the first node; and at least a second system accessing component that is configured to generate for a second node second node data, wherein the second node data comprises: second node identification data and second node network data comprising a node proximity with each of at least one third nodes directly connected with the second node; and a database configured to receive and store: the first node data associated with the first node and the second node data associated with the second node and third node data associated with each of the third nodes wherein the third node data comprises third node identification data and third node network data and wherein the third node network data comprises at least one node proximity of the respective third node with at least one further node of the system directly connected to the respective third node; and a processing device that is configured to access the database and calculate a node proximity between each of the nodes of the system by considering the first node data, the second node data and the third node data; wherein (Continued)

Registration process flowchart the system is configured upon triggering by the first node to generate associated to the first node at least one communication object, each communication object comprising: at least one communication condition and at least one communication threshold; and wherein the data processing device is configured to calculate a communication score between the first node and the at least one second node for a communication object based on the first node data and the second node data and the said communication object; wherein the system is configured to communicate or make accessible the communication object to the at least one second node based on the communication score between the first node and the second node and the at least one communication threshold of the communication object. In a second embodiment, a respective method that can be carried out by the system is disclosed.

23 Claims, 12 Drawing Sheets

(51) Int. Cl.
  *H04L 12/18* (2006.01)
  *G06F 16/2457* (2019.01)

(52) U.S. Cl.
  CPC ...... *H04L 41/0816* (2013.01); *H04L 41/0836* (2013.01); *H04L 41/0893* (2013.01); *H04L 41/12* (2013.01)

(58) Field of Classification Search
  CPC .. G06F 21/6236; G06F 16/951; G06F 16/955; G06F 16/9566; G06F 16/24578; G06F 16/13; G06F 16/23; G06Q 30/0255; G06Q 30/0241; G06Q 30/0269; G06Q 30/0261
  See application file for complete search history.

(56) References Cited

U.S. PATENT DOCUMENTS

| | | |
|---|---|---|
| 2014/0222555 A1 | 8/2014 | Dass |
| 2015/0100420 A1* | 4/2015 | Van Horn ......... G06F 16/24578 |
| | | 705/14.53 |
| 2015/0271206 A1* | 9/2015 | Schultz ............... H04L 12/1827 |
| | | 726/3 |

* cited by examiner

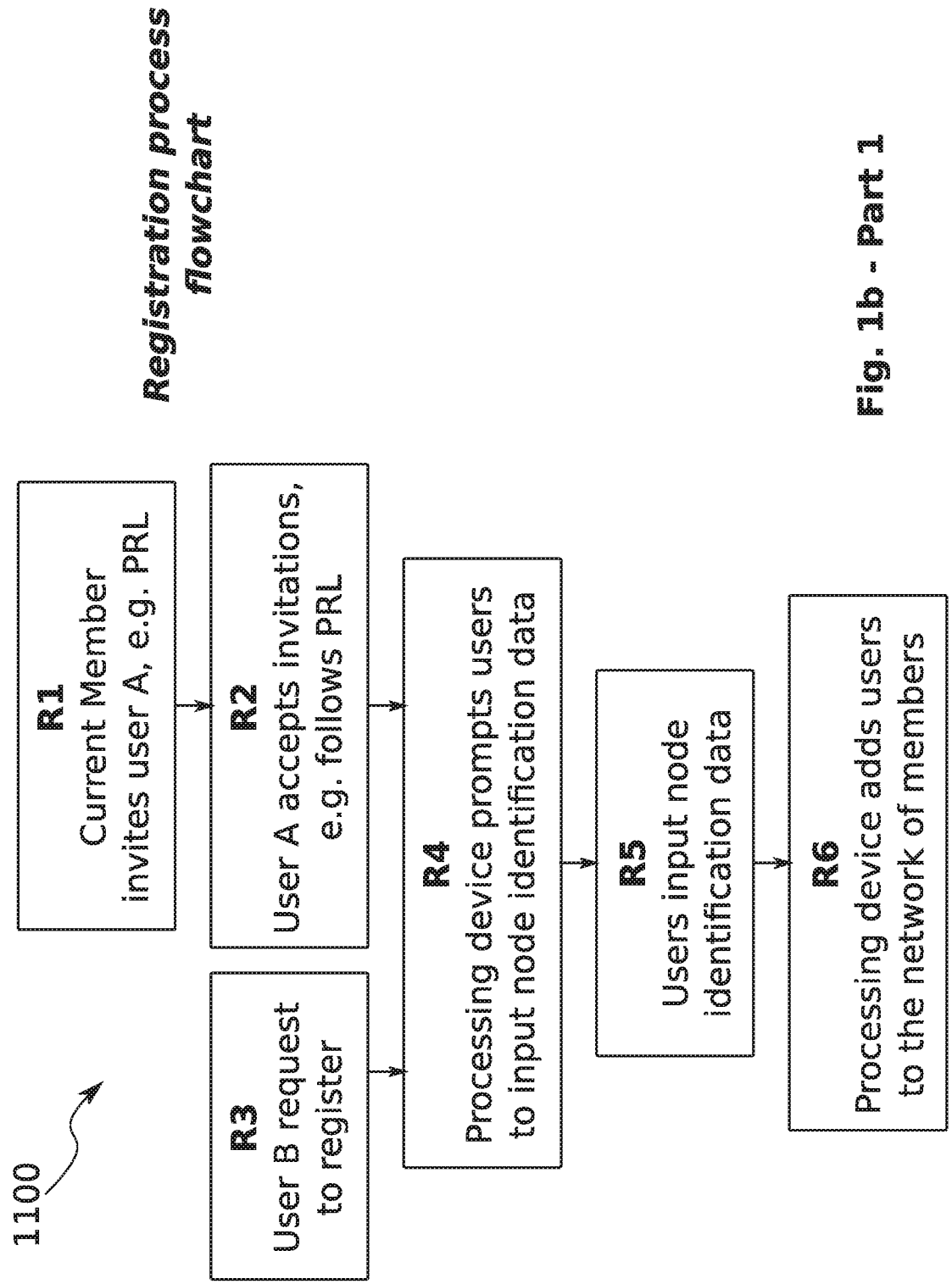
Fig. 1b - Part 1

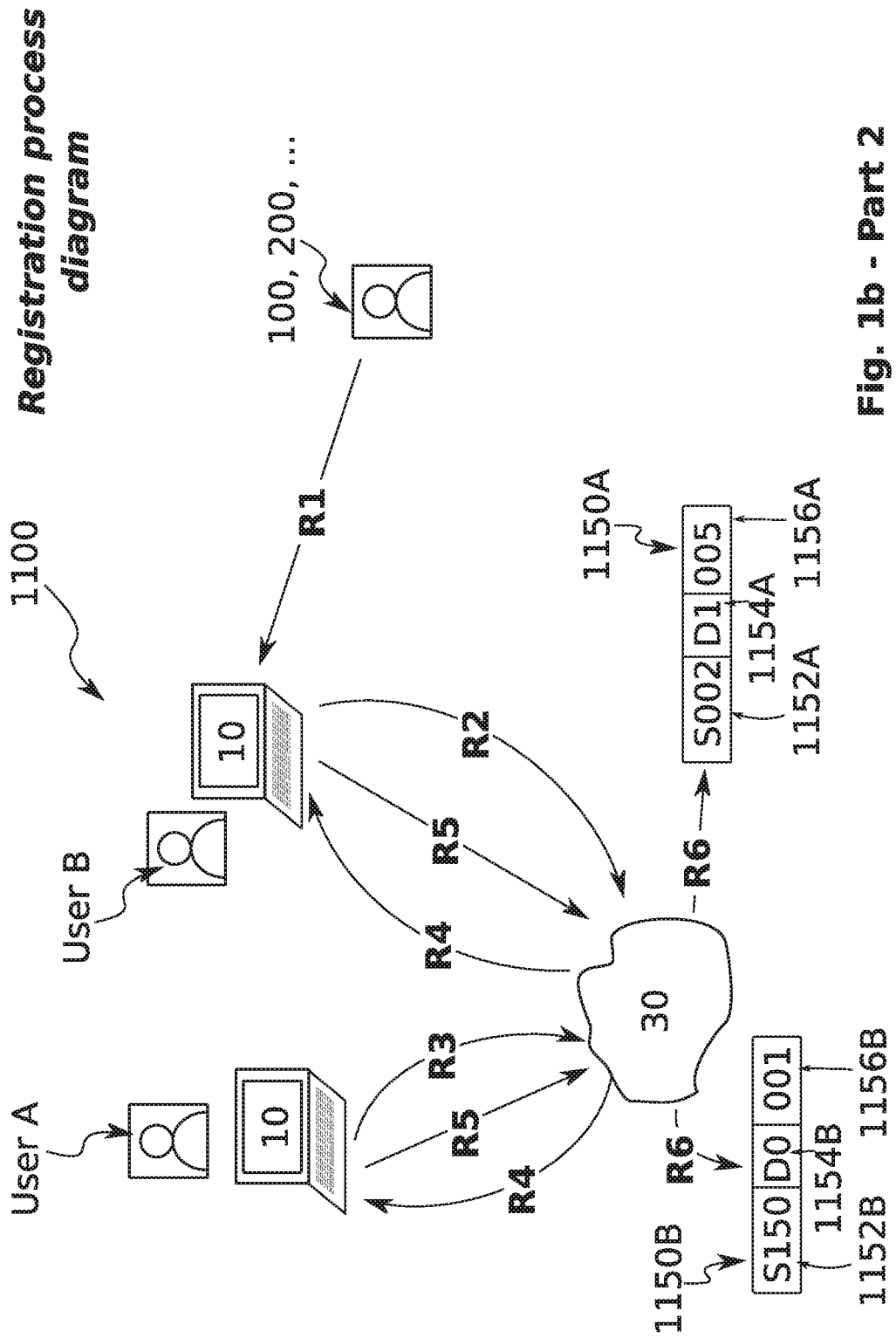
Fig. 1b - Part 2

COMMUNICATION SYSTEM AND METHOD

FIELD

The present invention relates to a system and a method to allow communication between at least two nodes or parties.

INTRODUCTION

Recent years have witnessed the development of many peer-to-peer platforms (P2P). A P2P platform is usually a decentralized platform wherein individuals can directly interact with each other. The interaction usually is carried out with individual creating or posting offers and other individual on the platform being able to view and respond to such offers.

Within P2P platforms, individuals can post offers regarding renting or sharing of goods and services or sometimes even donating goods. Individuals on the platform can have different roles for each transaction, i.e. can have the role of the lessor, host, seller or the role of lessee, guest or buyer. Usually or it is often the case that individuals that can interact through such P2P platforms do not know each-other prior to the interaction or they do not have any direct or indirect personal relation with each other.

Most of P2P platforms are configured to be completely open for all potential persons or entities that can access the platform. The intention usually is that the offerings on those platforms are (shall be) visible to everyone who can access the platform, which can often be accessible through Internet. In many cases, it is even not necessary to register as a user (i.e. become part of the platform), in order to be able to view (or book) the offerings.

However, the strategy usually followed by current P2P platform "everybody on the platform can see/book everything on the platform" can have shortcomings. One of such shortcomings is the trust problem, due to the fact, that private individuals interacting with each other typically do not know each other nor do they have any direct or indirect personal relationships with each other on which they could build mutual trust. This can be the source of suspicion or fear on both interacting parties, hence decreasing the chance of a smooth interaction between the two entities.

Further, the interaction cannot be achieved directly. Usually, one of the parties making the offer is required to accept (or reject) bookings (requests for interaction) from individuals. This may delay the completion of an interaction—i.e. the interaction cannot be completed instantly (e.g. without the consent of the offeror).

Further, as the P2P platforms are usually configured to provide an offer posted by a peer to (possibly) all other peers on the platform or even to all other individuals that may access the platform (e.g. through Internet) this raises privacy issues. Many individuals may not want their offers for interaction to be visible to anyone on the platform, but rather only to peers that the offeror may trust or may have a direct or indirect personal relation. Hence, such users, may hesitate on using such platforms.

Many P2P platforms are trying to solve the above problems by a rating system. In such a rating system, the transacting parties rate each other after the transaction has been completed (e.g. with one to five stars), whereas the average rating gets published and is intended to give both parties a reasonable and objective assessment (for future transactions), whether the counterparty is "trustworthy".

However, these rating systems have limitations. For example, if an interacting party has only done very few transactions on the platform, the average rating may be distorted i.e. highly influenced by one rating only. Thus, it may not represent a true rating of the respective party. Secondly, the ratings may not reflect the true satisfaction of the other party, i.e. people may rate each other very good, just not to appear impolite or in fear to receive a negative rating in response. Or, the host may give the guest an excellent rating (even though he was not satisfied), because the guest gave him also an excellent rating.

Apart from the deficiencies mentioned above, there as is more fundamental problem of such rating systems: they rate both the lessor and the lessee separately, but not the trust and the social proximity between them. That is, they do not rate the interaction between two interacting parties but rather the parties. However, this may not be advantageous as a party may have different interacting capabilities with different parties (e.g. friends, family members, friends of friends).

The following patent applications also tangibly address the issue of peer-to-peer interaction.

WO2013027971 is related to "a friend finding method which forms a network by using friend information stored in the phone books of user mobile terminals, and searches for friends by using various nicknames of the users within a set range of the formed network; and a system therefore."

US2014222555A1 discloses a Social revenue management method with the following features: A system and method of social revenue management is disclosed. A member of an online social network reveals a commercial offer from a third party to their social network. The offer is customized and endorsed by the first user and typically includes details such as the price. A customization app obtained from a party outside the social network is used to create the offer. The offer is typically to reserve a bookable entity for a period of time, typically accommodation or transportation. When one or more of the contacts accepts the offer, an agent of the third party rewards the first user with a commission calculated using the purchase price of the offer.

WO2013027971A2 relates to a Friend finding method and system therefor and discloses a network by using friend information stored in the phone books of user mobile terminals, and searches for friends by using various nicknames of the users within a set range of the formed network; and a system therefore.

US2006085253A1 utilizes a method and system to utilize a user network within a network-based commerce platform and claims a method and a system to utilize a user network within a network-based commerce platform. For example, the method includes identifying a target group including at least one other user of the network-based commerce system based on at least one group association rule, the at least one group association rule being selected by a first user, communicating transaction information to the identified target group, and facilitating the transaction between at least one target user of the identified target group and the first user, wherein the first user and the identified target group have an existing relationship.

WO2016148377A1 is an advertisement platform apparatus qualified by the determination of a platform apparatus in which similarities between advertisements are determined, and, among the advertisements determined to have a high degree of similarity, the recipients of each advertisement are shared with each other in providing advertisements, thereby enlarging the number of people receiving advertisements and thus allowing an increase in advertising effectiveness to be anticipated.

WO2017027206A1 discloses a Social network-based inventory management with an example embodiment that includes a system server configured for social network-based inventory management. The system server includes processors and non-transitory computer-readable storage media communicatively coupled to the processors. The media store instructions that, in response to execution by the processors, cause the processors to perform operations. The operations include receiving category specifications and access category definitions for access categories. The access category definitions include relationship criteria for the access categories. The operations include identifying a relationship between a second user and a first user, comparing an identified relationship with the relationship criteria, and determining which of the access categories the second user is included based on the comparison. In response to a received product request for a product offered by the first user, the operations include providing a product listing to the second user that is consistent with the category specification of the access category of the second user.

SUMMARY

In light of the above, it is an object of the present invention to overcome or at least alleviate the shortcomings of the prior art.

These objects are fulfilled by the method and system of the present invention.

In a first embodiment, a system for communication between a plurality of nodes is disclosed, which may also be referred as communication system. The system can be configured for facilitating at least two nodes for participating in a communication or interaction with each-other.

The system comprises a first system accessing component that is configured to generate first node data for a first node. The first node data generated for the first node comprises first node identification data and first node network data.

The first node identification data can be configured to uniquely identify a node (e.g. may comprise a unique ID or unique username of unique number assigned to the first node). In some embodiments, particularly when the first node can be assigned to users or parties or legal entities, the first node identification data may comprise name, address, email, age, descriptive information, photo, logo, of the respective user, party, or legal entity the first node can be assigned to.

The first node network data comprises at least one node proximity. More particularly, the system can comprise at least one further node, referred as at least one third node, that can be directly connected to the first node. A node proximity is assigned to each of the direct connections of the first node with the at least one third node. The at least one node proximity is comprised in the first node network data. Put simply, the first node can be directly connected with at least one third node and the connection can be specified and/or weighted by the node proximity. The node proximity can be configured to specify the presence of a connection between a first node and a third node and an identification of the third node (such that it can be determined to which connection of the first node with a third node a respective node proximity refers to) and in some embodiments, the node proximity may comprise a score or a label or a weighting or a rating of the connection (such that different direct connections can be ranked or differentiated).

The system further comprises at least one second system accessing component that is configured to generate second node data for each of at least one second nodes. The second node data generated for each of the at least one second nodes comprises second node identification data and second node network data.

The second node identification data can be configured to uniquely identify a second node (e.g. may comprise a unique ID or unique username of unique number assigned to the second node). In some embodiments, particularly when the second node can be assigned to users or parties or legal entities, the second node identification data may comprise name, address, email, age, descriptive information, photo, logo, of the respective user, party, or legal entity the second node can be assigned to.

The second node network data comprises at least one node proximity. More particularly, the system can comprise at least one further node, referred as at least one third node, that can be directly connected to the second node. Each of the direct connections of the second node with the at least one third node is assigned a node proximity. The at least one node proximity is comprised in the second node network data. Put simply, the second node can be directly connected with at least one third node and the connection can be specified and/or weighted by the node proximity. The node proximity can be configured to specify the presence of a connection between a second node and a third node and an identification of the third node (such that it can be determined to which connection of the second node with a third node a respective node proximity refers to) and in some embodiments, the node proximity may comprise a score or a label or a weighting or a rating of the connection (such that different direct connections can be ranked or differentiated).

The system further comprises a database, which may also be referred as communication system database. The database is configured to store the first node data associated with the first node, the second node data associated with each of the at least one second nodes and third node data associated with each of the at least one third nodes. The third node identification data can be configured to uniquely identify a third node (e.g. may comprise a unique ID or unique username of unique number assigned to the third node). In some embodiments, particularly when the third node can be assigned to users or parties or legal entities, the third node identification data may comprise name, address, email, age, descriptive information, photo, logo, of the respective user, party, or legal entity the third node can be assigned to.

The third node network data comprises at least one node proximity. More particularly, the system can comprise at least one further node, that can be directly connected to the third node. Each of the direct connections of the third node with the at least one further node is assigned a node proximity. The at least one node proximity is comprised in the third node network data. Put simply, the third node can be directly connected with at least one further node and the connection can be specified and/or weighted by the node proximity. The node proximity can be configured to specify the presence of a connection between a third node and a further node and an identification of the further node (such that it can be determined to which connection of the third node with a further node a respective node proximity refers to) and in some embodiments, the node proximity may comprise a score or a label or a weighting or a rating of the connection (such that different direct connections can be ranked or differentiated).

In other words, the database of the system can be configured to receive and store node data for each of the nodes of the system and wherein said node data comprises node identification data and node network data.

The system further comprises a processing device. The processing device is configured to access the database, e.g. access node data that is stored in the database. The processing device is further configured to calculate a node proximity between each of the nodes of the system based on the node data that is stored in the database. This can be advantageous as it can facilitate the creation of a network of members (e.g. a graph wherein each vertex in the graph is a node of the system), which may be an efficient representation of the nodes of the system and their connections.

This can further be advantageous, particularly for determining the connections between the nodes in the system. Thus, the processing device may determine the direct connections of each node of the system based on the node network data of the respective node. Utilizing the node network data (more particularly the node proximities comprised therein) the processing device can be configured to also determine indirect connections between the nodes. An indirect connection can refer to a level two (or higher, e.g. level three, level four, level five and so on) connection. For example, by determining a direct connection between a node A and a node B, and further a direct connection between the node B and a node C, the processing device may infer an indirect connection between node A and node C (through node B). In this particular example, the indirect connection between node A and node C (through node B) is a level two connection. If further, the node C comprises a direct connection with a node D, the processing device may determine the presence of an indirect connection between node A and node D (through nodes B and C). In this particular example, the indirect connection between node A and node D (through nodes B and C) is a level three connection.

In embodiments, wherein the node proximity comprised in the node network data of each node further comprises a score or a label or a weighting or a rating of the direct connection, the processing device may further be configured to calculate the respective node proximities of indirect connections. Referring to the above example, the processing device may calculate the respective node proximity between node A and node C comprising a score or a label or a weighting or a rating of the connection, if the node proximities of the connection between node A and node B and the connection between node B and node C comprise a score or a label or a weighting or a rating of the connection. In this example, node A can be the first node, node C can be a second node and node B can be a common third node that can be directly connected to the first node and second node and thus the processing device can calculate a node proximity of the indirect connection between the first node and the second node through the common third node. It will be understood that this is a mere illustrative example.

In a similar manner as described above for the case of a level two connections, the processing device can calculate node proximities of level three or more indirect connections that may exist between two nodes. For example, a level three connection can be defined as follows: a node A can be directly connected with a node B; a node B can be directly connection with a node C and a node C can be directly connected with a node D—the connection between A and D through nodes B and C can be defined as a level three connection.

The system is further configured upon being triggered by the first node to generate communication object associated to the first node. That is, a node of the system can trigger the system to generate a communication object which the system associates to the triggering node (i.e. it can be determined which node triggered the generation of the communication object through the association of the communication object to the triggering node). For sake of clarity, the node that trigger the system to generate a communication object is referred as a first node for the respective communication object.

The communication object comprises at least one communication condition and at least one communication threshold.

The processing device is configured to calculate for a communication object (its generation being triggered by the first node) a communication score between the first node and the at least one second node based on the first node data and the second data and the said communication object. For example, during the calculation of the communication score between the first node and a second node, the processing device may consider the node proximity between the first node and the second node. Further, the processing device may consider the eligibility of the second node for the communication object while calculating the communication score by comparing the second node data of the second node with communication object conditions.

The system is further configured to communicate or make accessible the communication object to the at least one second node based on the communication score between the first node and the second node and the at least one communication threshold of the communication object. That is, by comparing the communication score between a first node and each of the at least one second node with the at least one communication threshold of the communication object it can be determined whether to communicate or make accessible the communication object to the respective second node. Based on this comparison further parameters or conditions can be set that determine how the communication can take place between the first node and each of the at least one second nodes, e.g. based on the said comparison a selection of some of the communication conditions can be performed.

Communicating or making accessible the communication object associated with a first node to at least one second node according to the communication score between the first node and respective second node and the communication threshold(s) of the communication object can be advantageous.

Firstly, it allows the communication object to be visible only to those second nodes that exceed a certain communication threshold. In other words, instead of providing the communication object to all the nodes in the system, the utilization of the communication score allows for a "selection" of second nodes that the communication object can be provided to. Said selection of second nodes is carried automatically by the system.

Secondly, the second node may not only be a node with direct connection of the first node (which triggered the generation of the communication system) but can also be a node with an indirect connection. It will be understood that the term indirect connection can refer to level two connections, but can also refer to level two (or higher) connections. The communication score depends on the node proximity (which can be calculated by the processing device also for indirect connections) and may result in a value that exceed the specified communication thresholds. In other words, the system can allow the communication object to be provided to nodes of the system that are proximal to the first node, independently of they comprising direct or indirect connections with the first node.

Further still on this regard, the first node (that triggers the generation of the communication object) can set the communication threshold. Through this setting the first node can control to which second nodes the communication object can be provided. Thus, instead of setting the visibility of the communication object in the manner of "direct connections only", or "level one or level two connections", the setting of the communication threshold allows a more flexible approach to setting the visibility of the communication object. That is, the communication object may be provided to any node on the system—as long as the communication score of the first node with the other node exceeds the communication threshold.

Thirdly, the communication score is relational and can quantify the strength of trust between the two nodes for the specific communication. That is, the communication score is not assigned to nodes (e.g. first node) but to the relation between the first node and each of the second nodes. Thus, for example the communication score may indicate a good score between the first node and a node A and may indicate a bad score between the first node and a node B. Hence, the communication between the first node with node A can take place with better conditions than between the first node and node B. In other words, a node is not "universally" rated with a score but instead the node's relation with other nodes for a specific communication can be expressed through the communication score.

Fourthly, the communication score is communication specific. That is, for different communications the communication score between the same two nodes may be different. In other words, during the calculation of the communication score data related to the communication object is considered. This can allow an eligibility check of the second node for participating in the communication with the first node.

The assignment "first node", "second node" and "third node" are communication specific. For different communications the assignment may change. The terms are used as: first node referring to a node triggering the generation of a communication object, second node referring to a node that may or may not (depending on the communication score) communicate with the first node through the communication object and third node referring to other nodes in the system that can be connected to the first and second node.

Nodes can be added in the system through a registration process.

During the registration process the system (e.g. the database) can receive node data. Preferably, node identification data, such as, personal data, associated with the new node can be received during the node registration process.

The data processing device can be configured to generate a prompt for node data and send the prompt to a system accessing component, preferably to the system accessing component being used by a user or entity or party for which the new node is being added.

The user, entity or party associated to the new node can access the system utilizing a system accessing component. The system accessing component can be configured to receive the prompt for node data and output it to the user, entity or party associated to the new node.

The user, entity or party associated to the new node can input the node data and wherein the system accessing component sends the node data to the processing device.

The system can be configured to store the node data received during the registration process in the system database.

A new node can independently initiate the registration process. In this case the node can be added as a seed member (or seed node) without any direct connections with other nodes in the system.

A new node can also be invited by another node (referred as inviter node) to register in the system. In this case the node can be added as a descendant member—that is, with a direct connection to the inviter node.

In some system embodiments, the node proximity may comprise a binary metric configured to indicate the presence or absence of a connection between two nodes of the system. For example, the node proximity may only be generated for nodes between which a connection exists.

The node proximity may comprise a non-binary metric configured to rate a connection between two nodes of the system. In such embodiments, to each direct or indirect connection between two nodes in the system a score can be assigned (or calculated and assigned). In such embodiments, the node proximity facilitates not only the determination of a presence of a connection but also the rating of connections.

In some embodiments, the node proximity of direct connections can be provided (i.e. input) by the respective directly connected nodes. For example, the nodes may connect with one another (e.g. send/receive/accept/reject connection requests). Further, nodes may rate their direct connections (e.g. by providing a score or level of connections or type of connection (e.g. family member, friend, acquittance)).

The processing device can further be configured to determine for any two nodes of the system if a direct connection between the two nodes, a level two connection between the nodes, a level three connection between the nodes and so on exists between the two nodes.

A direct connection can be determined based on the node network data. The network proximities comprised therein can specify the direct connections of the respective node with other nodes in the system.

A level two connection between two nodes can be determined based on an overlap of node network data of the two nodes. That is, two nodes can be directly connected with another node. Hence, they can be indirectly connected with each other through the other nodes. This can be determined by identifying the existence of at least one node in both the node network data of the two nodes. If multiple common nodes are found the indirect connection that results the closest proximity between the two nodes can be considered only. Simply put, a level two connection between two nodes can be determined by identifying a direct connection of the two nodes with a common node.

A level three connection between two nodes can be determined by identifying a direct connection between to other nodes, wherein the two other nodes are each directly connected with either one of the two nodes.

The processing device can further be configured to calculate the communication score between the first node and the second node for the communication object created by the first node based on the node proximity of the connection from the first node to the second node. In other words, the communication score between two nodes can be calculated based on the node proximity between the two nodes.

The node proximity assigned to a connection between two nodes can be configured to distinguish between different levels of proximity between the two nodes.

The node proximities can be configured to encounter any real number, preferably within a predefined interval and wherein the lower the number the closer the proximity can be.

The proximities can be assigned to attributes, such as "closest friend(s)", "closest friends of closest friends", "friends of closest friends", "friends of friends".

The processing device can be configured to generate a network of members. The network of members can comprise for each node of the system a respective vertex in the network of members and respective edges between vertices based on the node network data. That is, edges can represent connection between members and node proximities can be assigned to edges.

The network of members can comprise a graph. This can be an efficient manner of representing the nodes and connection between the nodes. Graph theory can be utilized to efficiently store the graph (i.e. encode in machine language) and to efficiently determine connections between nodes.

The network of members can comprise (or be configured as) a weighted graph. The connections between the nodes in the weighted graph can be weighted with the respective node proximity of the connection between the nodes.

The node proximity can comprise (or be configured as) an asymmetric metric. Hence, the network of members can be configured as a directed graph. That is, depending on the direction of the connection the node proximity may comprise different values.

The node proximity can also be configured as a symmetric metric and the network of members can be a non-directed graph.

The at least one system accessing component can be a terminal, such as a computer or a handheld device.

The at least one system accessing component can be configured to exchange data with the processing device.

The at least one system accessing component can be configured to exchange data with the database.

The processing device can be configured to facilitate the exchange of data between the at least one system accessing component and the database.

The processing device can comprise a computer or server.

The processing device can comprise a remote server or cloud component.

The system can be configured to push the at least one communication object created by the first node to the at least one second node based on a comparison of the communication score between the first node and the second node and the at least one communication threshold of the communication object.

The communication object can comprise data of goods and services to rent or sell or provide by at least one of the nodes of the system, referred as the first node. The communication object can preferably further comprise a time when to rent or sell or provide the goods and services and yet further preferably a price of renting or selling or providing the goods and services.

In some embodiments, a list of prices (i.e. different price options) can be comprised by the communications object.

The communication object can comprise an offer for accommodation. This can allow the nodes of the system to generate offers for accommodation and let other nodes on the system (selected by comparing respective communication scores with communications threshold) to view and interact with (e.g. book) offers for accommodation.

The communication object can comprise an offer for rental of tangible assets, such as, car, vintage-cars, boats, general equipment, sporting and outdoor equipment, tools, children/baby equipment.

The communication object can comprise an offer for selling of tangible assets, such as, car, vintage-cars, boats, general equipment, sporting and outdoor equipment, tools, children/baby equipment, tickets for concerts or theatres.

The communication object can comprise an offer or recommendation of services such as, cleaning, driving, babysitting, housekeeping, craftsmen, plumber, artisans.

The nodes of the system can be assigned to parties, such as natural or legal parties. These can be individuals or organizations.

The node identification data can comprise at least one of a name of a party and a pseudonym of the party and a system component id used by the party.

The system can comprise further nodes and respective system accessing components. In other words, the system is not limited to the first and second system component or to the first and second and third nodes. In general, the system may comprise any number of nodes and/or system accessing components.

In some embodiments, nodes and respective node data can be fed into the system from a database, for example, an external database, such as an external social media database. External social media databases may provide a plurality of nodes with respective connections between one another. Further, a plurality of external databases may contribute their data into the system.

The system can be configured to provide a rental or purchasing offer of the first node to other nodes in the system according to the communication score between the first node and the nodes. The rental or purchasing offer can be comprised by a communication object, which creation can be triggered by the first node. The respective communication score between the first node and other nodes can be compared with the communication threshold(s) comprised by the communication object. Based on this, it can be determined whether to provide the rental or purchasing offer of the first node to the respective other node in the system. This limits the number of nodes which will be provided with the rental or purchasing offer to only those nodes with a communication score with the first node exceeding preset communication threshold(s).

Further, not only the determination of whether to provide the rental or purchasing offer (or in general the communication object which in some instances can be a purchasing offer) of a first node to another node of the system but also a set of communication conditions can be selected based on the communication score between the first node and each respective other node. For example, the rental or purchasing offer can be provided with different prices (and/or different priorities and/or different service levels) to different nodes depending on the respective communication score between the first node and the respective node. For example, when the communication score between the first node and another node is smaller than a communication threshold a first price (and/or a first priority and/or a first service level) can be determined and the communication object can be provided to the said other node with the first price (and/or a first priority and/or a first service level). Otherwise a second price (and/or a second priority and/or a second service level) can be determined and the communication object can be provided to the said other node with the second price (and/or a second priority and/or a second service level).

In some embodiments, the higher the communication score (i.e. lower proximity between two nodes), the higher the determined price and/or the lower the priority and/or the lower the service level.

The communication conditions of the communication objects can comprise self-adjustment of prices (and/or of priorities and/or of service levels) on the basis of time, so that with and progression of time the pricing can decrease by preset values.

The communication conditions of the communication objects can comprise self-adjustment prices according to the past behavior of nodes. For example, past communications between two nodes can contribute into decreasing the price that the communication object created by one of the nodes can be provided to the other node.

The system can be configured to handle at least a deposit and the payment.

The system can further comprise a credit database that can be configured to track and accumulate bonuses for parties that have let (i.e. sell, rent or provide) a device or service and deductions for parties that have received the offer.

The communication score can be calculated based on at least one sub-score.

A linear model can weight the respective sub-scores and accumulate the weighted sub-scores to obtain the communication score.

A non-linear model can also be used to combine sub-scores and weights to obtain the communication score.

The communication score between two nodes can be calculated based on a first sub-score comprising the node proximity of the two nodes. If the node proximity is asymmetric the node proximity of the connection from the node that triggered the generation of the communication object (for which the communication score is being calculated) to the other node can be used.

The communication score between two nodes can be calculated based on the node proximity of at least one indirect connection between the two nodes. The said node proximity of the indirect connection can be calculated by the processing device based on the node proximity of the direct connections comprised in the node network data of the respective nodes creating the indirect connection. If the node proximity is asymmetric the node proximity of the connection from the node that triggered the generation of the communication object (for which the communication score is being calculated) to the other node can be used.

The communication score between two nodes can be calculated based on a third sub-score comprising an evaluation of the history of past communications between the nodes. This may include past communications between the two nodes.

The communication score between two nodes can be calculated based on a further sub-score comprising a score obtained from external data, such as, an external social network. For example, the presence of a connection in an external social network can be used herein.

In a second embodiment a method for communication between at least two nodes is disclosed. The method can preferably be carried out by a system according to the above-discussed system embodiments.

The method comprises a first system accessing component generating for a first node first node data, wherein the first node data comprises: first node identification data and first node network data. The first node network data comprises a node proximity with each of at least one third nodes directly connected with the first node.

The method further comprises a second system accessing component generating for a second node second node data, wherein the second node data comprises: second node identification data and second node network data. The second node network data comprises a node proximity with each of at least one third nodes directly connected with the second node.

Further, the method comprises a database receiving and storing: the first node data associated with the first node and the second node data associated with the second node and third node data associated with each of the third nodes. The third node data comprises third node identification data and third node network data. The third node network data comprises at least one node proximity of the respective third node with at least one further node directly connected to the respective third node.

The method further comprises a processing device accessing the database and calculating a node proximity between each of the first, second and third nodes by considering the first node data, the second node data and the third node data.

The method further comprises the first node triggering the generation of at least one communication object associated to the first node. The communication object comprises at least one communication condition and at least one communication threshold.

The method further comprises the data processing device calculating a communication score between the first node and the at least one second node based on the first node data and the second node data and the communication object.

The method also comprises communicating or making accessible the communication object to the at least one second node based on the communication score between the first node and the second node and the at least one communication threshold of the communication object.

In some embodiments, the method can further comprise pushing the communication object of the first node to the second node according to the communication score between the first node and the second node calculated for that communication object.

In some embodiments, the method can further comprise the step of assigning the nodes (e.g. the first, second and third nodes) to parties, such as natural or legal parties.

In some method embodiments, the at least one of the node identification data comprises at least one of a name of a party and a pseudonym of the party and a system component id used by the party.

In some embodiments, the method can further comprise the step of further adding nodes and respective components.

In some embodiments, the method can further comprise the step of feeding further nodes and node data from an existing a data base.

In some embodiments, the method can further comprise the step of feeding further nodes and node data into the system from another data base, such as a social media data base.

In some embodiments, the method can further comprise the step of feeding further nodes and node data into the system from a plurality of data bases, such as a plurality of social media data bases.

In some method embodiments, the communication object can comprise data of goods and services to let by a node referred as a first node and further preferably a time when to let the goods and services.

In some embodiments, the method can further comprise the step of assigning the node proximity with a value 1 to the closest proximity, with a value 2 to one more count of proximity further away, with a value 3 even one more count of proximity further away.

In some embodiments, the method can further comprise the step of assigning the node proximity to attributes, that can quantify or qualify social proximity or trust, such as "closest friend(s)", "closest friends of closest friends", friends of closest friends", "friends of friends" or similar.

In some embodiments, the method can further comprise the step of providing a rental or purchasing offer of the first node to other nodes according to the communication score between the first node and other nodes.

In some embodiments, the method can further comprise the step of providing a rental or purchasing offer of the first node to other nodes according to the communication score between the first node and the other nodes and wherein the communication conditions can comprise prices (and/or priorities and/or service levels) that differ as a function of the communication score.

In some embodiments, the method can further comprise the step of providing a rental or purchasing offer of the first node to the other nodes according to the communication score between the first node and the other nodes and wherein the communication conditions can comprise prices that increase with an in increasing count communication score.

In some embodiments, the method can further comprise the step of providing a rental or purchasing offer of the first node to other nodes according to the communication score between the first node and the other nodes and wherein the communication conditions can comprise self-adjustment of prices on the basis of time, so that with and progression of time the pricing can decrease by preset values.

In some embodiments, the method can further comprise the step of providing a rental or purchasing offer of the first node to other nodes according to the communication score between the first node and the other nodes and wherein the communication conditions can comprise self-adjustment of prices (and/or of priorities and/or of service levels), as a function of the past behavior of nodes.

In some embodiments, the method can further comprise the step of handling at least a deposit and the payment.

In some embodiments, the method can further comprise the step of tracking a credit database that accumulate bonuses for parties that have let a device and deductions for parties that have received the offer.

In some embodiments, the method can further comprise storing each communication object in the database.

In some embodiments, the method can further comprise the processing device comparing the communication score with at least one communication threshold associated to the communication object and communicating or making accessible the communication object to the at least one second node based on the result of the comparison.

In some embodiments, the method can further comprise adding a new node though a registration process.

In some embodiments, the method can further comprise the data processing device generating a prompt for node data.

In some embodiments, the method can further comprise the data processing device sending a prompt for node data to a system accessing component.

In some embodiments, the method can further comprise a user, entity or party receiving the prompt for node data and providing node data.

The method according to the preceding embodiment, further comprising receiving node data, preferably node identification data, such as, personal data, associated with the new node during the node registration process.

In some embodiments, the method can further comprise storing the node data associated to a new node to the database.

In some embodiments, the method can further comprise the processing device generating a network of members comprising for each node a respective vertex in the network of members and respective edges between vertices based on the node network data.

In some embodiments the step of the first node triggering the generation of at least one communication object associated to the first node can comprise the first node triggering the generation of an offer for rental of an accommodation.

In some embodiments the step of the first node triggering the generation of at least one communication object associated to the first node can comprise the first node triggering the generation of an offer for rental of tangible assets, such as, car, vintage-cars, boats, general equipment, sporting and outdoor equipment, tools, children/baby equipment.

In some embodiments the step of the first node triggering the generation of at least one communication object associated to the first node can comprise the first node triggering the generation of an offer for selling of tangible assets, such as, car, vintage-cars, boats, general equipment, sporting and outdoor equipment, tools, children/baby equipment, tickets for concerts or theatres.

In some embodiments the step of the first node triggering the generation of at least one communication object associated to the first node can comprise comprises the first node triggering the generation of an offer or recommendation of services, such as cleaning, driving, babysitting, housekeeping, craftsmen, plumber, artisans, or financial services, such as loans, guarantees or insurances.

In some embodiments, the step of the data processing device calculating a communication score can comprise calculating the communication score based on at least one sub-score.

In some embodiments, the step of the data processing device calculating a communication score can comprise calculating the communication score based on at least one sub-score according to a linear model that weights respective sub-scores and accumulated the weighted sub-scores to obtain the communication score.

In some embodiments, the step of the data processing device calculating a communication score can comprise calculating the communication score based on a first sub-score comprising the node proximity of the two nodes the communication score is being calculated for.

In some embodiments, the step of the data processing device calculating a communication score can comprise calculating the communication score based on the node proximity of at least one indirect connection between the two nodes for which the communication score is being calculated for, said node proximity of the indirect connection being calculated by the data processing device based on the node proximity of the direct connections comprised in the node network data of the respective nodes.

In some embodiments, the step of the data processing device calculating a communication score can comprise calculating the communication score based on a third sub-score, comprising an evaluation of the history of past communications between the nodes for which the communication score is being calculated for.

In some embodiments, the step of the data processing device calculating a communication score can comprise calculating the communication score based on a further sub-score, comprising a score obtained from external data, such as, an external social network.

In some embodiments, the method can further comprise the step of the second node searching for a communication object.

In some embodiments, the method can further comprise the second node providing at least one communication searching criteria, such as, at least one keyword.

In some embodiments, the method can further comprise the step of the processing device comparing the communication searching criteria with at least one communication condition and/or at least one communication threshold.

The invention is further described with the following numbered embodiments.

Numbered Embodiments

Below, system embodiments will be discussed. These embodiments are abbreviated by the letter "S" followed by a number. Whenever reference is herein made to "system embodiments", these embodiments are meant.

S1. System for communication between at least two nodes:
(a) a first system accessing component (10A) that is configured to generate for a first node (100) first node data, wherein the first node data comprises:
first node identification data and
first node network data comprising a node proximity (60) with each of at least one third nodes (110) directly connected with the first node (100); and
(b) at least a second system accessing component (10B) that is configured to generate for a second node (200) second node data, wherein the second node data comprises:
second node identification data and
second node network data comprising a node proximity (60) with each of at least one third nodes (210) directly connected with the second node (200); and
(c) a database (3100) configured to receive and store:
the first node data associated with the first node (100) and
the second node data associated with the second node (200) and
third node data associated with each of the third nodes (110, 210) wherein the third node data comprises
i. third node identification data and
ii. third node network data and wherein the third node network data comprises at least one node proximity (60) of the respective third node (110, 210) with at least one further node of the system directly connected to the respective third node (110, 210); and
(d) a processing device (30) that is configured to access the database (3100) and calculate a node proximity (60) between each of the nodes (100, 200, 110 and 210) of the system by considering the first node data, the second node data and the third node data;
(e) wherein the system is configured upon triggering by the first node (100) to generate associated to the first node (100) at least one communication object (3010), each communication object (3010) comprising:
at least one communication condition (3011) and
at least one communication threshold (3012); and
(f) wherein the data processing device (30) is configured to calculate a communication score (3500) between the first node (100) and the at least one second node (200) for a communication object (3010) based on the first node data and the second node data and the said communication object (3010);
(g) wherein the system is configured to communicate or make accessible the communication object (3010) to the at least one second node (200) based on the communication score (3500) between the first node (100) and the second node (200) and the at least one communication threshold (3012) of the communication object (3010).

Definition of Nodes

S2. The system according to the preceding embodiment, wherein any of the nodes of the system, such as, any of the nodes (100, 200, 110, 210) is considered a first node (100) for a communication object (3010) if the node triggers the generation of that communication object (3010) and said communication object (3010) is assigned to said node.

S3. The system according to any of the preceding embodiments, wherein any of the nodes of the system, such as, any of the modes (100, 200, 110, 210) is considered a second node (200) for a communication object (3010) if the system communicates or makes accessible the communication object (3010) to the said node and wherein the generation of the communication object (3010) is triggered by another node of the system.

S4. The system according to the two preceding embodiments, wherein any of the nodes of the system, such as, any of the nodes (100, 200, 110, 210) is considered a third node (110, 210) if it is directly connected to a first node (100) and/or to a second node (200)

That is, the assignment "first node (100)", "second node (200)" and "third node (110, 210)" is communication object (3010) specific. For different communication objects (3010) the assignment may change.

Registration of Nodes

S5. The system according to any of the preceding system embodiments, wherein the system is configured to add a new node in the system though a registration process (1100).

S6. A system according to the preceding embodiment, wherein the system is configured to receive node data, preferably node identification data, such as, personal data, associated with the new node during the node registration process (1100).

S7. A system according to any of the two preceding embodiments, wherein the data processing device (30) is configured to generate a prompt for node data and send the prompt for node data to a system accessing component (10).

S8. The system according to any of the three preceding embodiments, wherein the new node accesses the system by utilizing a system accessing component (10) and the system accessing component (10) is configured to receive the prompt for node data from the processing device (30) and output the prompt to the new node.

S9. The system according to the preceding embodiment, wherein the system accessing component (10) is configured to facilitate the input of node data by the new node and transfer the node data to the processing device (30).

S10. The system according to any of the four preceding embodiments, wherein the system is configured to store the node data received during the registration process (1100) in the system database (3100).

S11. The system according to any of the six preceding embodiments, wherein at least one of the first node (100), the second node (200) and third node (110, 210) is added to the system during the registration process (1100).

S12. The system according to any of the seven preceding embodiments, wherein the system is configured to add the new node as a descendant node in the system if the new node is invited during the registration process (1100) by an existing node of the system otherwise the new node is added as a seed node.

S13. The system according to the preceding embodiment, wherein the processing device (30) automatically adds a node proximity (60) on the node network data of at least one of the descendant nodes and the node that invited the descendant node. That is, the processing device (30) adds the descendant nodes directly connected with the respective inviter node.

Node Proximity

S14. The system according to any of the preceding embodiments, wherein the node proximity (60) comprises a binary metric configured to indicate the presence or absence of a connection between two nodes of the system.

S15. The system according to any of the preceding embodiments, wherein the node proximity (60) comprises a non-binary metric configured to rate a connection between two nodes of the system.

S16. The system according to any of the preceding embodiments, wherein a node of the system provides at least one node proximity (60) with at least one other directly connected node.

S17. The system according to the preceding embodiment, wherein
the first node (100) provides the node proximity (60) with at least one third node (110) directly connected with the first node (100) and
the second node (200) provides the node proximity (60) with at least one third node (210) directly connected with the second node (200) and
the third node (110, 210) provides the node proximity (60) with at least one further node directly connected with the third node.

S18. The system according to any of the preceding embodiments, wherein the processing device (30) is configured that for any two nodes of the system to determine (if it exists) at least one of a direct connection between the two nodes, a level two connection between the nodes, a level three connection between the nodes and so on and wherein the data processing device is configured to
determine a direct connection between the two nodes based on the node network data of the two nodes and assign the node proximity (60) to the direct connection according to the node proximity (60) comprised in the network of data and
determine a level two connection between the two nodes if the node network data of the two nodes overlap on at least one common node and assign the node proximity (60) to the level two connection according to the node proximities (60) of the direct connection of each of the nodes with the common node and if multiple common nodes exists select the common node that yields the node proximity (60) indicating the highest proximity between the two nodes and
determine a level three connection between the two nodes if the node network data of the level one connection nodes of one of the two nodes overlap with the node network data of the level one connection nodes of the other of the two nodes and if multiple common nodes exists select the common node that yields the node proximity (60) indicating the highest proximity between the two nodes and so on.

S19. The system according to any of the preceding embodiments, wherein the processing device is configured to determine (if it exists) a direct connection from the first node (100) to the second node (200) if the second node is one of the third nodes (110) and the respective node proximity (60) comprised in the network data of the first node (100) is assigned to the direct connection from the first node (100) to the second node (200).

S20. The system according to the preceding embodiment, wherein the processing device (30) is configured to calculate the communication score (3500) between the first node (100) and the second node (200) for the communication object (3010) created by the first node (100) based on the node proximity (60) of the connection from the first node (100) to the second node (200).

S21. The system according to any of the preceding embodiments, wherein the processing device (30) is configured to determine (if it exists) a direct connection from the second node (200) to the first node (100) if the first node (100) is one of the third nodes (210) and the respective node proximity (60) comprised in the network data of the second node (200) is assigned to the direct connection from the second node (200) to the first node (100).

S22. The system according to any of the preceding embodiments, wherein the processing device (30) is configured to determine (if it exists) a second level connection between the first node (100) and the second node (200) if there exits at least one common node on the at least one third node (110, 210) directly connected to both the first node (100) and the second node (200) and the processing device (30) is configured to calculate the node proximity (60) of the second level connection between the first node (100) and the second node (200) based on the node proximities (60) of the first node (100) and second node (200) with the common third node (110, 210) and if multiple common third nodes (110, 210) exists select the common node (110, 210) that yields the node proximity (60) indicating the highest proximity between the first node (100) and the second node (200).

S23. The system according to any of the preceding embodiments wherein the node proximities (60) are configured to distinguish between different levels of proximity between nodes (100, 200, 110, 210) and further nodes of system.

S24. The system according to the preceding embodiment wherein the node proximities (60) are configured to encounter any real number, preferably within a predefined interval and wherein the lower the number the closer is the proximity.

S25. The system according to any of the preceding embodiments wherein the proximities can be assigned to attributes, that quantify or qualify social proximity and trust, such as "closest friend(s)", "closest friends of closest friends", friends of closest friends", "friends of friends" or similar.

Network of Members

S26. The system according to any of the preceding embodiments, wherein the processing device (30) is configured to generate a network of members (2) comprising for each node (100, 200, 110, 210) of the system a respective vertex in the network of members (2) and respective edges between vertices based on the node network data.

S27. The system according to the preceding embodiment, wherein the network of members (2) comprises a graph (2).

S28. The system according to the preceding embodiments, wherein the network of members (2) comprises a weighted graph (2) and the connections between the nodes in the weighted graph (2) are weighted with the respective node proximity (60) of the nodes connected by the connection.

S29. The system according to any of the three preceding embodiments, wherein the node proximity (60) comprises an asymmetric metric and the network of members (2) is a directed graph (2).

S30. The system according to any of the four preceding embodiments, wherein the node proximity (60) comprises a symmetric metric and the network of members (20) is a non-directed graph (20).

System Accessing Component

S31. The system according to any of the preceding embodiments, wherein the at least one system accessing component (10) is a terminal, such as a computer or a handheld device.

S32. The system according to any of the preceding embodiments, wherein the at least one system accessing component (10) comprises at least one of an RFID transponder, an integrated system, a chip, a chip implant (e.g. under the skin of a user), a voice recognition device, a fingerprint sensor or the like.

S33. The system according to any of the preceding embodiments, wherein the at least one system accessing component (10) is configured to exchange data with the processing device (30).

S34. The system according to any of the preceding embodiments, wherein the at least one system accessing component (10) is configured to exchange data with the database (3100).

S35. The system according to the preceding embodiment, wherein the processing device (30) is configured to facilitate the exchange of data between the at least one system accessing component (10) and the database (3100).

Processing Device

S36. The system according to any of the preceding embodiments wherein the processing device (30) comprises a computer or server.

S37. The system according to any of the preceding embodiments, wherein the processing device comprises at least one of an integrated circuit, a microcontroller, a processor, a programmable processor, a field-programmable-gate-array or the like.

S38. The system according to the preceding embodiment wherein the processing device (30) comprises a remote server or cloud component.

S39. The system according to any of the preceding embodiment, wherein the processing device (30) is configured to store and receive data to/from the database (3100).

Communication Object

S40. The system according to any of the preceding embodiments wherein the system is configured to push the at least one communication object (3010) created by the first node (100) to the at least one second node (200) based on a comparison of the communication score (3500) between the first node (100) and the second node (200) and the at least one communication threshold (3012) of the communication object (3010).

S41. The system according to any of the preceding embodiments wherein the communication object (3010) comprises data of goods and services to rent or sell or provide by at least one of the nodes of the system, referred as the first node (100) and further preferably a time when to rent or sell or provide the goods and services and yet further preferably a price of renting or selling or providing the goods and services.

S42. The system according to any of the preceding embodiments, wherein the communication object (3010) comprises an offer for accommodation (3010).

S43. The system according to any of the preceding embodiments, wherein the communication object (3010) comprises an offer for rental of tangible assets, such as, car, vintage-cars, boats, general equipment, sporting and outdoor equipment, tools, children/baby equipment.

S44. The system according to any of the preceding embodiments, wherein the communication object (3010) comprises an offer for selling of tangible assets, such as, car, vintage-cars, boats, general equipment, sporting and outdoor equipment, tools, children/baby equipment, tickets for concerts or theatres.

S45. The system according to any of the preceding embodiments, wherein the communication object (3010) comprises an offer or recommendation of services, such as, cleaning, driving, babysitting, housekeeping, craftsmen, plumber, artisans, or financial services, such as loans, guarantees or insurances.

Nodes

S46. The system according to any of the preceding embodiments wherein the nodes (100, 200, 110, 210) of the system are assigned to parties, such as natural or legal parties.

S47. The system according to any of the preceding embodiments wherein the at least one of the node identification data comprises at least one of a name of a party and a pseudonym of the party and a system component id used by the party.

S48. The system according to any of the preceding embodiments comprising further nodes and respective system accessing components (10).

S49. The system according to any of the preceding embodiments wherein further nodes and node data is fed into the system from a database.

S50. The system according to any of the preceding embodiments wherein further nodes and node data is fed into the system from an external database (3200), such as an external social media database (3200).

S51. The system according to any of the preceding embodiments wherein further nodes and node data is fed into the system from a plurality of external databases (3200), such as a plurality of social media external databases (3200).

S52. The system according to any of the preceding embodiment wherein the system is configured to provide a rental or purchasing offer of the first node (100) to the nodes (200, 110, 210) according to the communication score (3500) between the first node (100) and the nodes (200, 110, 210).

S53. The system according to any of the preceding embodiments wherein the system is configured to provide a rental or purchasing offer of the first node (100) to the nodes (200, 110, 210) according to the communication score (3500) between the first node (100) and the nodes (200, 110, 210) and wherein the communication conditions (3011) comprise prices and/or priorities and/or service levels that differ as a function of the communication score (3500).

S54. The system according to any of the preceding embodiments wherein the system is configured to provide a rental or purchasing offer of the first node (100) to the nodes (200, 110, 210) according to the communication score (3500) between the first node (100) and the nodes (200, 110, 210) and wherein the communication conditions (3011) comprise prices that increase with increasing communication score (3500).

S55. The system according to any of the preceding embodiments wherein the system is configured to provide a purchasing offer of the first node (100) to the nodes (200, 110, 210) according to the communication score (3500) between the first node (100) and the nodes (200, 110, 210) and wherein the communication conditions (3011) comprise self-adjustment prices on the basis of time, so that with and progression of time the pricing decreases by preset values.

S56. The system according to any of the preceding embodiments wherein the system is configured to provide a purchasing offer of the first node (100) to the nodes (200, 110, 210) according to the communication score (3500) between the first node (100) and the nodes (200, 110, 210) and wherein the communication conditions (3011) comprise self-adjustment of prices and/or priorities and/or service levels, as a function of the past behavior of nodes (200, 110, 210).

S57. The system according to any of the preceding embodiments wherein the system is configured handle at least a deposit and the payment.

S58. The system according to any of the preceding embodiments with a credit database that tracks and accumulates bonuses for parties that have let a device and deductions for parties that have received the offer.

Calculation of Communication Score

S59. The system according to any of the preceding embodiments, wherein the communication score (3500) is calculated based on at least one sub-score (3310).

S60. The system according to the preceding embodiments, wherein the communication score (3500) is calculated based on at least one sub-score (3310) according to a linear model that weights respective sub-scores (3310) and accumulated the weighted sub-scores to obtain the communication score (3500).

S61. The system according to any of the preceding embodiments, wherein the communication score (3500) is calculated based on a first sub-score (3310A) comprising the node proximity (60) of the two nodes the communication score (3500) is being calculated for.

S62. The system according to any of the preceding embodiments, wherein the communication score (3500) is calculated based on the node proximity (60) of at least one indirect connection between the two nodes the communication score (3500) is being calculated for, said node proximity (60) of the indirect connection being calculated by the data processing device (30) based on the node proximity (60) of the direct connections comprised in the node network data of the respective nodes.

S63. The system according to any of the preceding embodiments, wherein the communication score (3500) is calculated based on a third sub-score 3310C comprising an evaluation of the history of past communications between the nodes the communication score (3500) is being calculated for.

S64. The system according to any of the preceding embodiments, wherein the communication score (3500) is calculated based on a further sub-score 3310N comprising a score obtained from external data, such as, an external social network.

External herein refers to being external to the system—i.e. not comprised, generated or managed by the system.

Below, method embodiments will be discussed. These embodiments are abbreviated by the letter "M" followed by a number. Whenever reference is herein made to "method embodiments", these embodiments are meant.

M1. Method for communication between at least two nodes, particularly with a system according to any of the preceding system embodiments comprising:

(a) a first system accessing component (10A) generating for a first node (100) first node data, wherein the first node data comprises:
first node identification data and
first node network data comprising a node proximity (60) with each of at least one third nodes (110) directly connected with the first node (100); and (b) a second system accessing component (10B) generating for a second node (100) second node data, wherein the second node data comprises:
second node identification data and
second node network data comprising a node proximity (60) with each of at least one third nodes (210) directly connected with the second node (200); and (c) a database (3100) receiving and storing:
the first node data associated with the first node (100) and
the second node data associated with the second node (200) and
third node data associated with each of the third nodes (110, 210) wherein the third node data comprises
i. third node identification data and
ii. third node network data and wherein the third node network data comprises at least one node proximity (60) of the respective third node (110, 210) with at least one further node of the system directly connected to the respective third node (110, 210); and (d) a processing device (30) accessing the database (3100) and calculating a node proximity (60) between each of the nodes (100, 200, 110 and 210) of the system by considering the first node data, the second node data and the third node data;

(e) first node (100) triggering the generation of at least one communication object (3010) associated to the first node (100), each communication object (3010) comprising:
at least one communication condition (3011) and
at least one communication threshold (3012); and (f) the data processing device (30) calculating a communication score (3500) between the first node (100) and the at least one second node (200) based on the first node data and the second node data and the communication object (3010);

(g) communicating or making accessible the communication object (3010) to the at least one second node (200) based on the communication score (3500) between the first node (100) and the second node (200) and the at least one communication threshold (3012) of the communication object (3010).

General Embodiments

M2. The method according to the preceding embodiment further comprising pushing the communication object (3010) of the first node (100) to the second node (200) according to the communication score (3500) between the first node (100) and the second node (200) calculated for the communication object (3010).

M3. The method according to any of the preceding embodiments comprising the step of assigning the nodes (100, 200, 110, 210) to parties, such as natural or legal parties.

M4. The method according to any of the preceding embodiments wherein the at least one of the node identification data comprises at least one of a name of a party and a pseudonym of the party and a system component id used by the party.

M5. The method according to any of the preceding embodiments comprising the step of further adding nodes and respective components.

M6. The method according to any of the preceding embodiments comprising the step of feeding further nodes and node data from an existing a data base.

M7. The method according to any of the preceding embodiments comprising the step of feeding further nodes and node data into the system from another data base, such as a social media data base.

M8. The method according to any of the preceding embodiments comprising the step of feeding further nodes and node data into the system from a plurality of data bases, such as a plurality of social media data bases.

M9. The method according to any of the preceding embodiments wherein the communication object (3010) comprises data of goods and services to let by a node referred as a first node (100) and further preferably a time when to let the goods and services.

M10. The method according to the preceding embodiment comprising the step of assigning the node proximity (60) with a value 1 to the closest proximity, with a value 2 to one more count of proximity further away, with a value 3 even one more count of proximity further away.

M11. The method according to any of the preceding embodiments comprising the step of assigning the node proximity (60) to attributes, that quantifies or qualifies social proximity and trust, such as "closest friend(s)", "closest friends of closest friends", "friends of closest friends", "friends of friends", or similar.

M12. The method according to any of the preceding embodiment comprising the step of providing a rental or purchasing offer of the first node (100) to the nodes (200, 110, 210) according to the communication score (3500) between the first node (100) and the nodes (200, 110, 210).

M13. The method according to any of the preceding embodiments with the step of providing a rental or purchasing offer of the first node (100) to the nodes (200, 110, 210) according to the communication score (3500) between the first node (100) and the nodes (200, 110, 210) and wherein the communication conditions (3011) comprise prices and/or priorities and/or service levels that differ as a function of the communication score (3500).

M14. The method according to any of the preceding embodiments with the step of providing a rental or purchasing offer of the first node (100) to the nodes (200, 110, 210) according to the communication score (3500) between the first node (100) and the nodes (200, 110, 210) and wherein the communication conditions (3011) comprise prices that increase with increasing communication score (3500).

M15. The method according to any of the preceding with the step of providing a rental or purchasing offer of the first node (100) to the nodes (200, 110, 210) according to the communication score (3500) between the first node (100) and the nodes (200, 110, 210) and wherein the communication conditions (3011) comprise self-adjustment of prices and/or of priorities and/or of service levels on the basis of time, so that with and progression of time the pricing decreases by preset values.

M16. The method according to any of the preceding embodiments with the step of providing a rental or purchasing offer of the first node (100) to the nodes (200, 110, 210) according to the communication score (3500) between the first node (100) and the nodes (200, 110, 210) and wherein the communication conditions (3011) comprise self-adjustment of prices and/or of priorities and/or of service levels as a function of the past behavior of nodes (200, 110, 210).

M17. The method according to any of the preceding with the step of handling at least a deposit and the payment.

M18. The method according to any of the preceding embodiments with the step of tracking a credit database that accumulate bonuses for parties that have let a device and deductions for parties that have received the offer.

M19. The method according to any of the preceding embodiments, further comprising storing each communication object (3010) in the database (3100).

M20. The method according to any of the preceding embodiments, further comprising the processing device (30) comparing the communication score (3500) with at least one communication threshold (3012) associated to the communication object (3010) and communicating or making accessible the communication object (3010) to the at least one second node (200) based on the result of the comparison.

Registration of Nodes

M21. The method according to any of the preceding embodiments, further comprising adding a new node though a registration process (1100).

M22. The method according to the preceding embodiment, further comprising receiving node data, preferably node identification data, such as, personal data, associated with the new node during the node registration process (1100).

Network of Members

M23. The method according to any of the preceding embodiments, further comprising the processing device (30) generating a network of members (2) comprising for each node (100, 200, 110, 210) of the system a respective vertex in the network of members (2) and respective edges between vertices based on the node network data.

Communication Object

M24. The method according to any of the preceding embodiments, wherein step (e) comprises the first node (100) triggering the generation of an offer for accommodation (3010).

M25. The method according to any of the preceding embodiments, wherein step (e) comprises the first node (100) triggering the generation of an offer for rental of tangible assets, such as, car, vintage-cars, boats, general equipment, sporting and outdoor equipment, tools, children/baby equipment.

M26. The method according to any of the preceding embodiments, wherein step (e) comprises the first node (100) triggering the generation of an offer for selling of tangible assets, such as, car, vintage-cars, boats, general equipment, sporting and outdoor equipment, tools, children/baby equipment, tickets for concerts or theatres.

M27. The method according to any of the preceding embodiments, wherein step (e) comprises the first node (100) triggering the generation of an offer or recommendation of services, such as, cleaning, driving, babysitting, housekeeping, craftsmen, plumber, artisans, or financial services, such as loans, guarantees or insurances.

Communication Score

M28. The method according to any of the preceding method embodiments, wherein step (f) comprises calculating the communication score (3500) based on at least one sub-score (3310).

M29. The method according to any of the preceding method embodiments, wherein step (f) comprises calculating the communication score (3500) based on at least one sub-score (3310) according to a linear model that weights respective sub-scores (3310) and accumulated the weighted sub-scores to obtain the communication score (3500).

M30. The method according to any of the preceding method embodiments, wherein step (f) comprises calculating the communication score (3500) based on a first sub-score (3310A) comprising the node proximity (60) of the two nodes the communication score (3500) is being calculated for.

M31. The method according to any of the preceding method embodiments, wherein step (f) comprises calculating the communication score (3500) based on the node proximity (60) of at least one indirect connection between the two nodes the communication score (3500) is being calculated for, said node proximity (60) of the indirect connection being calculated by the data processing device (30) based on the node proximity (60) of the direct connections comprised in the node network data of the respective nodes.

M32. The method according to any of the preceding method embodiments, wherein step (f) comprises calculating the communication score (3500) based on a third sub-score 3310C comprising an evaluation of the history of past communications between the nodes the communication score (3500) is being calculated for.

M33. The method according to any of the preceding method embodiments, wherein step (f) comprises calculating the communication score (3500) based on a further sub-score 3310N comprising a score obtained from external data, such as, an external social network.

Search Process

M34. The method according to any of the preceding method embodiments, further comprising the step of the second node (200) searching for a communication object (3010).

M35. The method according to the preceding embodiment, further comprising the second node (200) providing at least one communication searching criteria (2020), such as, at least one keyword (2020).

M36. The method according to the preceding embodiment, further comprising the step of the processing device (30) comparing the communication searching criteria (2020) with at least one communication condition (3011) and/or at least one communication threshold (3012).

BRIEF DESCRIPTION OF THE FIGURES

FIG. 1b illustrates a user registration process according to an embodiment of the present technology;

DETAILED DESCRIPTION OF THE FIGURES

In the following, exemplary embodiments of the invention will be described, referring to the figures. These examples are provided to provide further understanding of the invention, without limiting its scope.

In the following description, a series of features and/or steps are described. The skilled person will appreciate that unless required by the context, the order of features and steps is not critical for the resulting configuration and its effect. Further, it will be apparent to the skilled person that irrespective of the order of features and steps, time delays between steps can be present between some or all of the described steps.

Figure 1A:
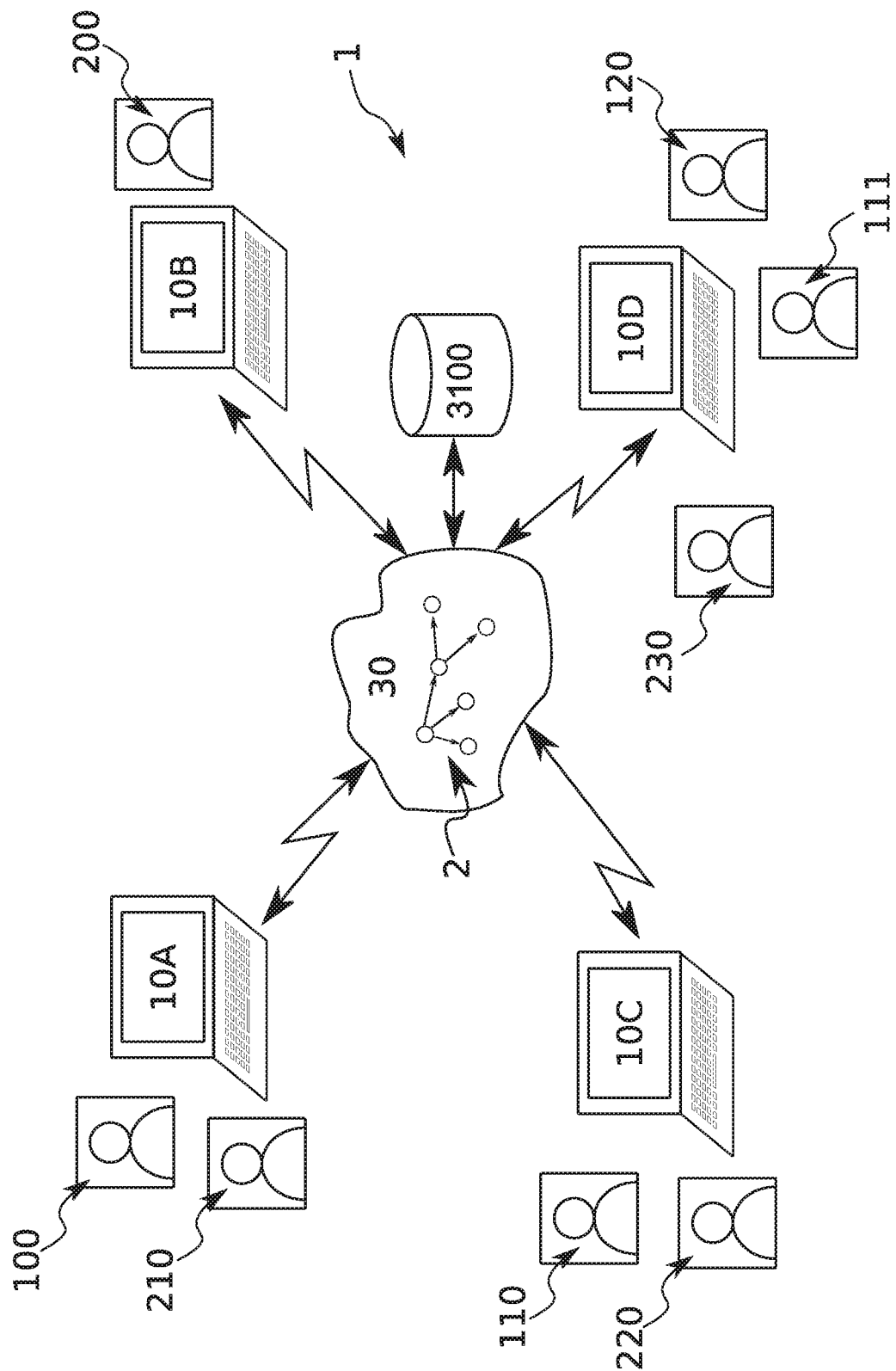
FIG. 1a depicts a schematic of the components of a communication system configured for communication between members of the communication system according to an embodiment of the present technology.

FIG. 1a depicts a schematic of a communication system 1 according to an embodiment of the present invention. The communication system 1 can be configured to allow efficient communication between at least two nodes (or members, or users, or parties) of the communication system 1. Preferably, the communication system 1 can be configured to allow efficient communication between a first node 100 and at least one second node 200, wherein the first node 100 can generate (i.e. create, post) at least one communication in the communication system 1 and the at least one second node 200 can participate (i.e. interact) in the said communication. For example, a first node 100 can post an "offer" in the communication system 1 and a second node 200 can see and/or send a request to said offer.

In FIG. 1a, eight nodes of the communication system 1 are depicted, wherein one of them is (arbitrarily) chosen as the first node 100 and a second one of them is (arbitrarily) chosen as the second node 200 and the rest as third, or auxiliary, nodes 110, 120, 111, 210, 220, 230. It should be noted, that the selection is performed for demonstrative purposes only and any node of the communication system 1 can be either a first node 100 (if a node generates a communication the node is considered as a first node 100 for that communication) or a second node 200 (if a node has not created the communication but participates or intends to participate in that communication the node is considered a second node 200 for that communication) or a third node 110, 120, 111, 210, 220, 230 (a node connected to the first and/or second nodes 100, 200). Put simply, the exemplary nodes 100, 200, 110, 120, 111, 210, 220, 230 are members of the communication system 1 and part of a network of members 2.

Further, the system can comprise a plurality of nodes (not limited to eight as depicted in the example of FIG. 1a). In general, through a registration process 1100 (see FIG. 1b), a user can become a member of the communication system 1.

Further for a specific communication a node of the communication system 1 can be a first node 100, a second node 200 or a third node 110, 120, 111, 210, 220, 230.

It is noted that throughout the text the terms members, nodes, users and parties are used interchangeably and convey the meaning of nodes in the communication system 1 that can communicate or interact using the communication system 1. Further, when the terms node, user, member or party is followed by a numeral 100, 200 and (110, 120, 111, 210, 220, 230) the first node 100, second node 200 and third node 110, 120, 111, 210, 220, 230 is meant. Otherwise, if the term node, user, member or party is not followed by a numeral then a node of the communication system 1 is meant. That is, the terms node, user, member or party not followed by referrals are meant as general terms to the nodes of the communication system 1. These definitions should be considered throughout the figure description and intent to facilitate a better understanding of embodiments disclosed in the figures.

The communication system 1 can comprise a processing device 30. The processing device 30 can comprise processing unit(s) (e.g. programmable processors), memory units, internet access units, etc. The processing device 30 can be a computer 30 or a server 30 or a cloud-based service provider 30. The processing device 30 may facilitate automation of processes required for carrying out communications and/or interactions between members of the communication system 1.

Figure 3A:
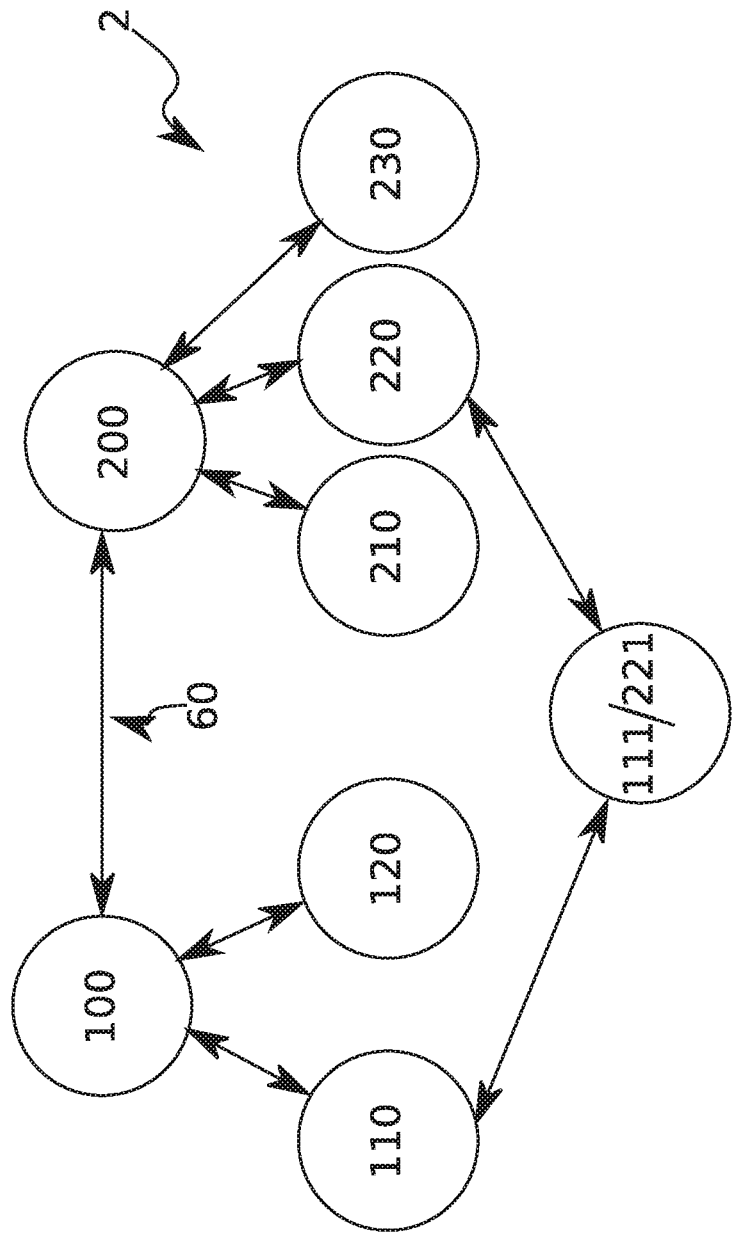
FIG. 3a depicts a second exemplary network members of the communication system.
Figure 3B:
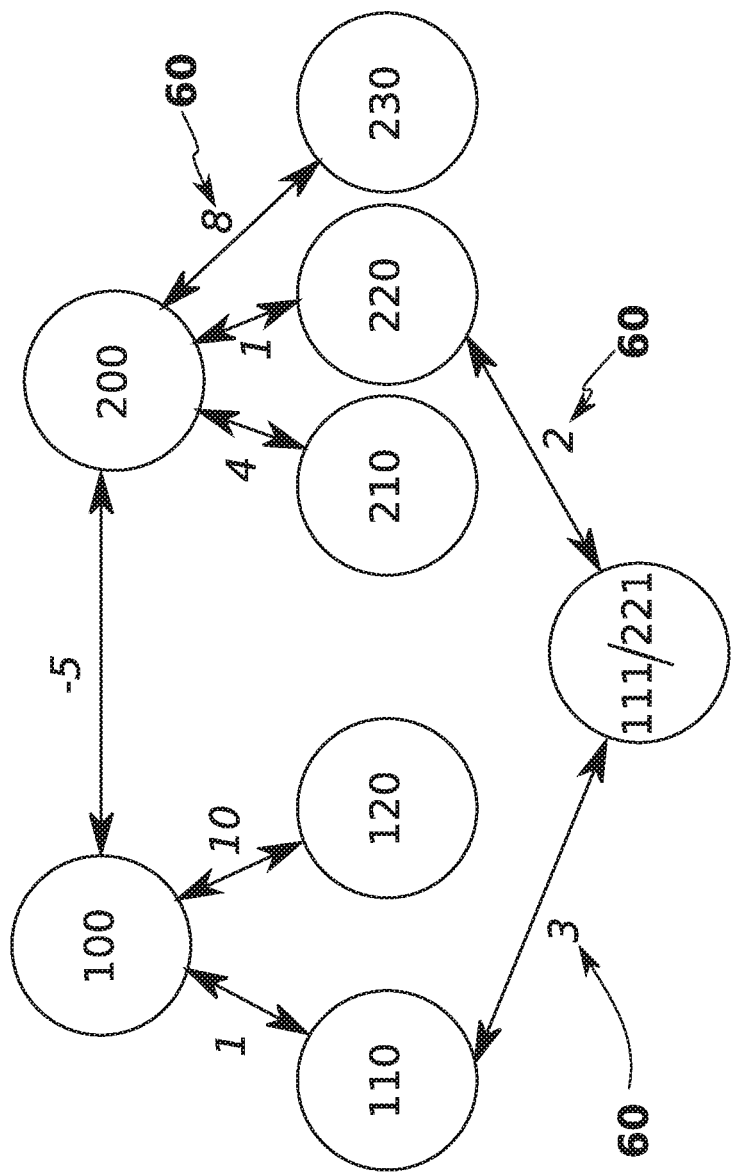
FIG. 3b depicts the second exemplary network of members of the communication system wherein the connections between members are weighted with a node proximity score.
Figure 3C:
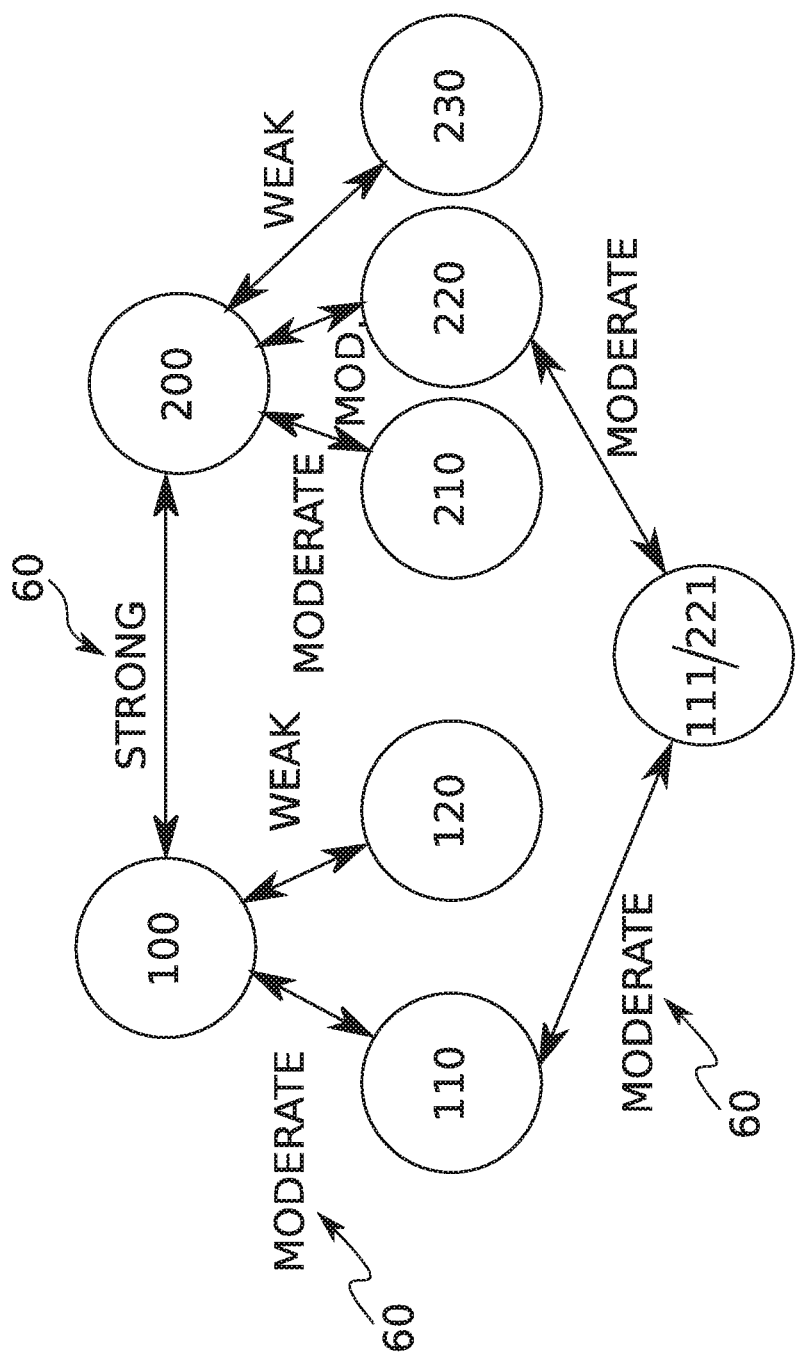
FIG. 3c depicts the second exemplary network of members of the communication system wherein the connection between members are labeled with a node proximity label.
Figure 4A:
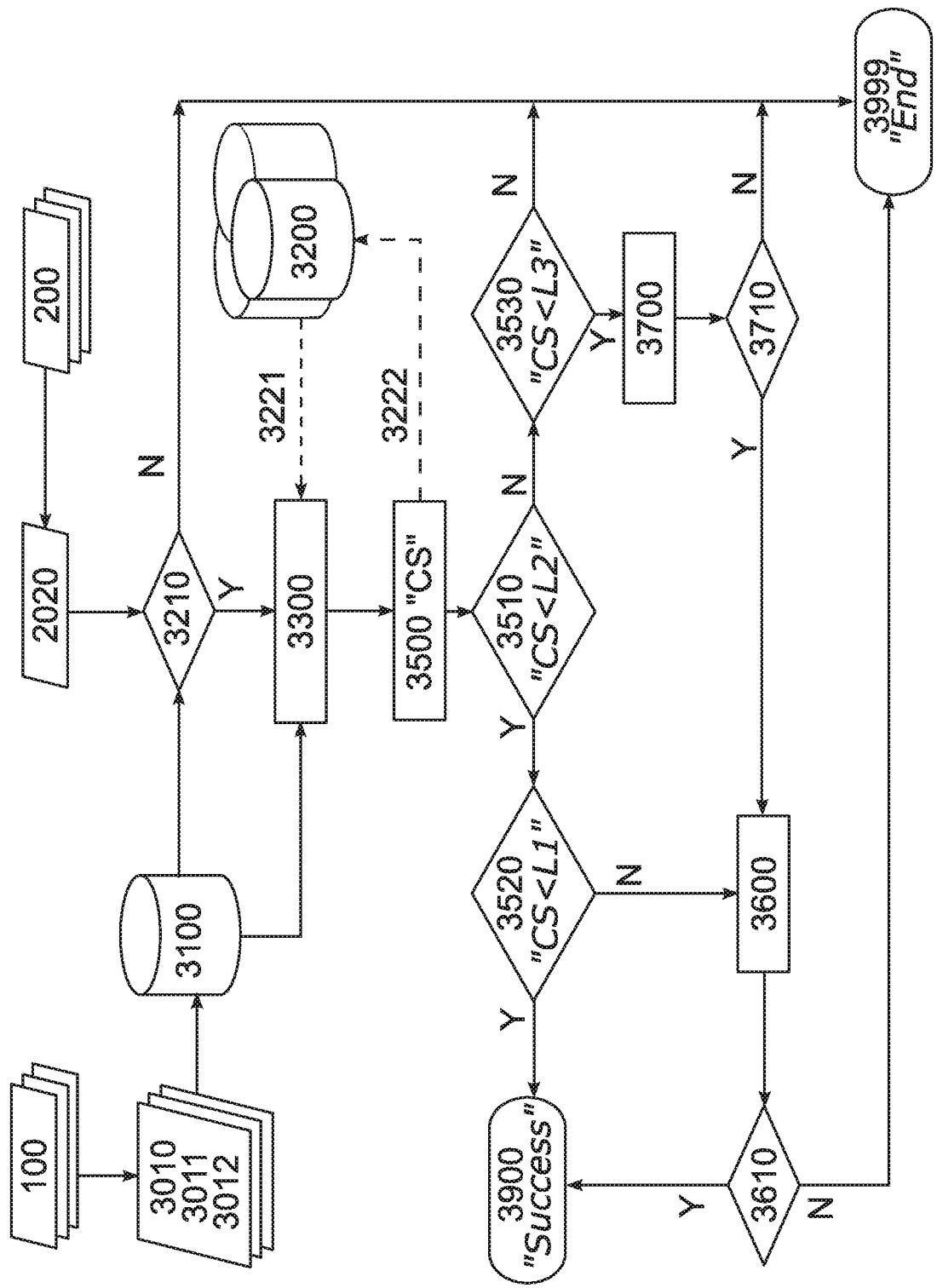
FIG. 4a illustrates how a communication between a first node and a second node can be carried out in the communication system according to an exemplary pull-based process based on a communication score between the nodes.
Figure 4B:
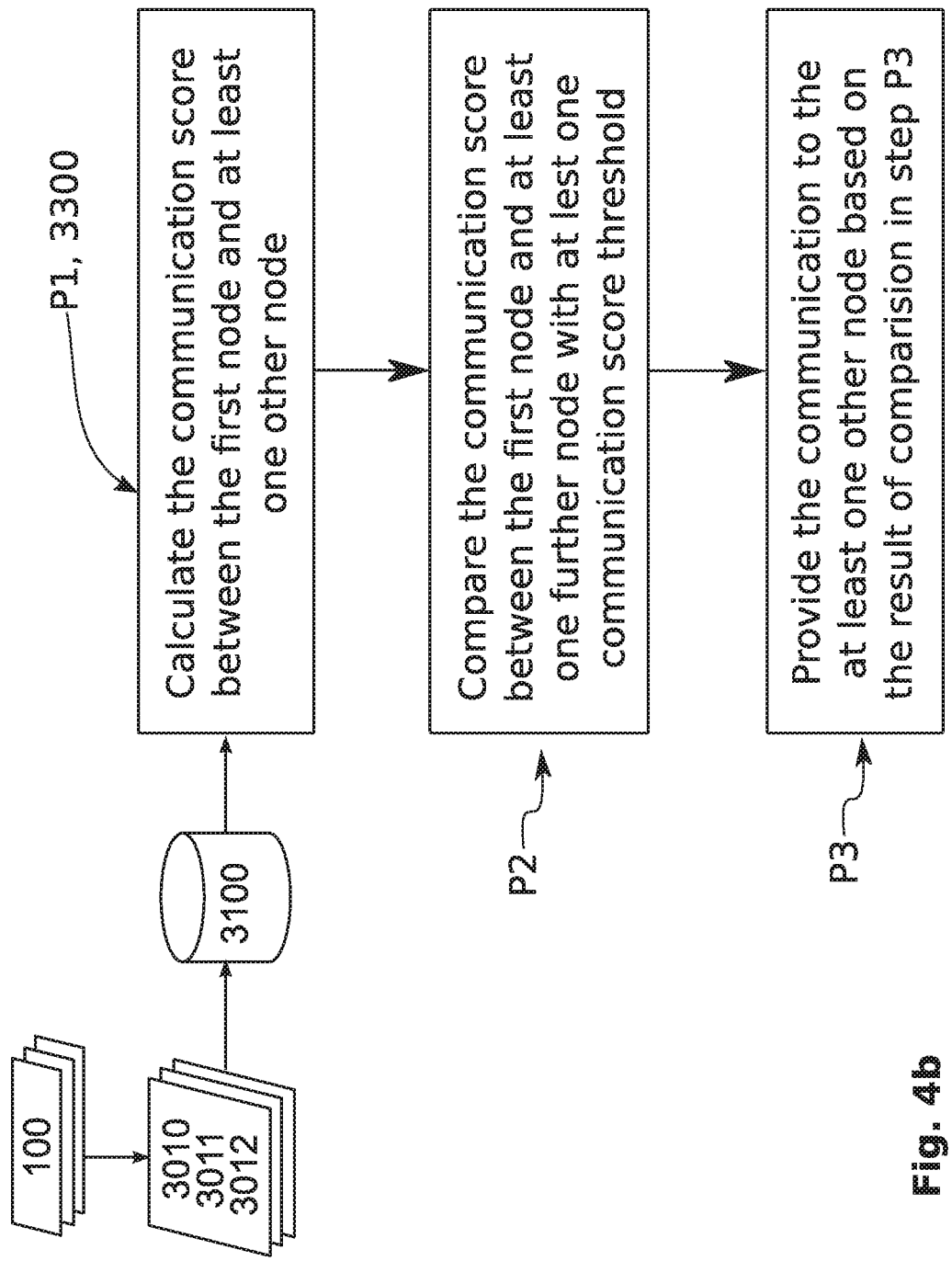
FIG. 4b illustrates how a communication between a first node and a second node can be carried out in the communication system according to an exemplary push-based process based on a communication score between the nodes.
Figure 4C:
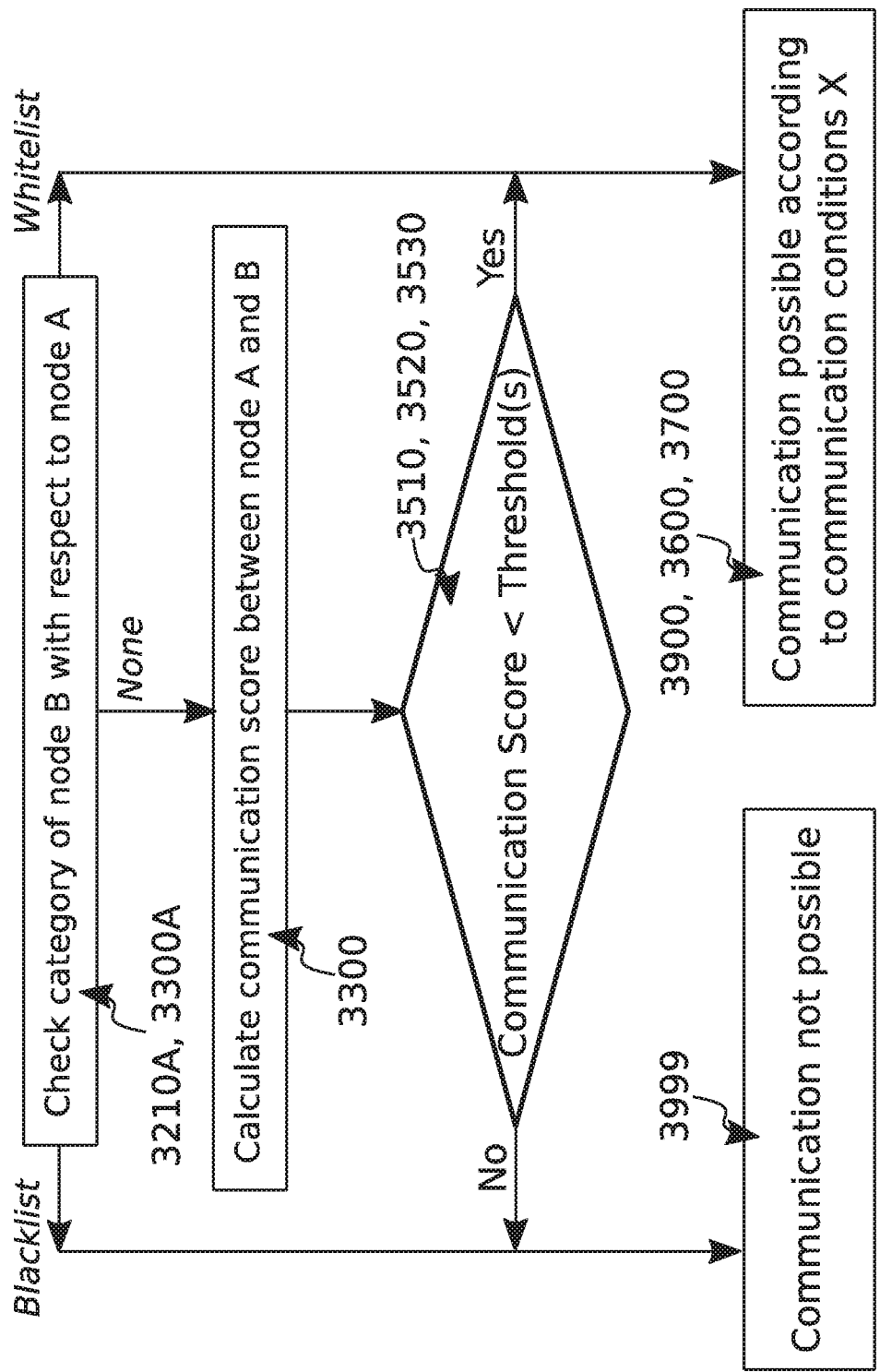
FIG. 4c illustrates how a communication between a first node and a second node can be carried out based on node categorization and communication score between the nodes.

The processing device 30 can be configured to generate and/or update network of members 2, set and/or adjust node proximity 60 (see FIGS. 1c to 3c) of a connection in the network of members 2, calculate a communication score 3500 (see FIGS. 4a to 4c and FIG. 5), compare a communication score 3500 with at least one communication threshold 3012 and/or determine or select at least one communication condition 3011 for carrying a communication 3010 (also referred as communication object 3010) based on the comparison of the communication score 3500 with at least one communication threshold 3012 (see FIGS. 4a to 4c).

Further the communication system 1 can comprise at least one system accessing component 10. The system accessing component 10 can be connected with the processing device 30 such that data can be transferred between the system accessing component 10 and the processing device 30. The system accessing component 10 and the processing device 30 can be locally or remotely installed with respect to each other. For example, the system accessing component 10 and the processing device 30 can be connected via LAN, WLAN, Internet and/or similar communication technologies. In general, any data transmission technology can be used for facilitating data transfer between the system accessing component 10 and the processing device 30. For example, the system accessing component 10 and the processing device 30 can be connected through a client-server model.

In some embodiment, the system accessing component 10 can be a user terminal 10, such as, a computer, laptop, smartphone, tablet, smartwatch, smart-speaker and/or other similar devices.

The system accessing component 10 can be configured to facilitate a user (e.g. human user or a robot or an IoT device or a chatbot or a smart-speaker or similar) accessing the features of the communication system 1. More particularly, the system accessing component 10 can facilitate a node to input information which can be transferred to the processing device 30. For example, the system accessing component 10 can comprise or be connected to an input device, such as, keyboard, mouse, touchscreen, camera (image sensor), microphone (audio data recorder), scanner (imager), smart-speaker, etc.

Similarly, the system accessing component 10 can facilitate information to be output to the nodes of the communication system 1, such that, it can be viewed by the nodes. For example, the system accessing component 10 can comprise or be connected to a monitor, touchscreen, speaker, printer, fax, smart-speaker, etc.

Although in FIG. 1a, the communication system 1 is depicted for exemplary purposes as comprising four system accessing components 10A, 10B, 10C, 10D, in general, the communication system 1 can comprise any number of system accessing components 10. For example, a user can use a personal device 10, i.e. a device owned by the user such as a personal smartphone 10, laptop 10 etc., to access the communication system 1.

Further still, multiple users can access the communication system 1 using the same system accessing component 10. For example, the users 230, 111 and 120 can access the communication system 1 using the system accessing component 10D at different times. Alternatively, the users 230, 111 and 120 can access the communication system 1 using the same system accessing component 10D at the same time, wherein three parallel connection sessions (one for each user) can be established between the system accessing component 10D and the processing device 30. For example, each user accesses the communication system 1 with a unique account.

In some embodiments, the at least one user can access the communication system 1 by accessing a website (not shown) using the system accessing component 10.

The communication system 1 can further comprise a communication system database 3100. The communication system database 3100 can comprise stored therein information related to nodes of the communication system 1. That is, for each node of the communication system 1 node data can be stored therein.

The node data can comprise node identification data for the members of the communication system 1. The node identification data (and/or the data structures facilitating the representation of a member on the communication system 1) can comprise name, surname, username, email, unique identifier and/or other information or personal information related to the member of the system.

The node data can also comprise node network data. The node network data of a node may comprise connections of the respective nodes. That is, the node network data of a node may comprise information regarding how many connections the node comprises, to which other nodes the node is connected and/or the node proximity 60 (see FIG. 1c) that may be assigned to at least one of the connections comprised by the respective node.

FIG. 1b illustrates a registration process 1100 according to an embodiment. The registration process 1100 is illustrated with a schematic diagram and with a flowchart.

A user (e.g. user A and user B) can become a member of the communication system 1 through the registration process 1100. More particularly, the registration process 1100 can allow the communication system 1 to obtain from a user node data, preferably node identification data.

An unregistered user may not be provided with all the features of the communication system 1, such as, creating and/or interacting in a communication 3010 (see FIG. 4). The registration process 1100 may allow the user the rights of using the features of the communication system 1.

As will be described in the following, a user can become either a seed member of the communication system 1 or a descendant member of the communication system 1.

In a step R3, a user B may request to register to the communication system 1. For example, the user B can use a system accessing component 10 and can request (e.g. via a website) to register to the communication system 1. In this case, user B independently requests to become a member of the communication system 1 (i.e. is not invited by an already member of the communication system 1, see step R1). By initiating the registration process with step R3, the respective user (e.g. user B) can become a seed member of the communication system 1.

Alternatively, the registration process 1100 can initiate with steps R1 and R2. In this case, in a step R1, an already registered user of the communication system 1 (e.g. member 100, 200, . . . ) can invite an unregistered user (e.g. user A) to become a member of the communication system 1. For example, the member 100, 200 in a step R1 can send an invitation, also referred as a personalized registration link (PRL), to user A. The personalized registration link (PRL) may comprise information such as the identity of the inviter node, the identity of the invited node and may direct the invited node to a registration process (e.g. to an electronic form to be completed).

In a step R2, the user A can accept the invitation (e.g. the PRL). If a user (e.g. user A) registers to the communication system 1 using an invitation from a member of the communication system 1, the respective user (e.g. user A) becomes a descendant member in the communication system 1. In this example, user A descends from the member 100, 200 that sent user A the invitation in step R1. Herein, the PRL comprising information such as the identity of the inviter node, the identity of the invited node may be utilized to establish the connection between the inviter node and the invited node.

In a step R4 the processing device 30 of the communication system 1, after receiving the request for registration (e.g. through registration links) from a user (e.g. user A and user B) can prompt the user to input node identification data.

The node identification data can comprise data unique to a respective member (e.g. a unique ID, username) that can be used to uniquely identify a member and differentiate members from each other. The node identification data that uniquely identify a member such as a unique ID or username, can either be provided by the user or can be automatically assigned by the communication system 1 to the user. Either way, the processing device 30 can ensure that the id or username assigned to or selected by the user is indeed unique e.g. by searching the communication system database 3100.

The node identification data can also comprise personal information regarding a member such as, first name, last name, birthdate, age, address, email, phone number, etc.

The node identification data can also comprise documents proving different abilities of a user, such as, driving licenses, sailing licenses. For example, this can be advantageous to evaluate if a user can interact with a communication 3010 (see FIG. 4a) comprising an offer for renting a sailing boat, or a car etc. The user may thus provide a document, such as a driving or sailing license (or the like) during or after the registration process. The document can be provided by the user either electronically (i.e. by uploading an electronic version of the document, e.g. scanned document) or by mail.

In some embodiments, in step R4 the processing device 30 can send a form to the user requesting to register and prompting the user to fill the form. Step R4, wherein the user receives the prompt to provide node identification data can be facilitated by the system accessing component 10 configured to receive data from the processing device 30 and output the data to the user (e.g. on a screen).

In a step R5, the user (e.g. user A and user B) can input the node identification data. Step R5 wherein the user can input the node identification data can be facilitated by the system accessing component 10 being configured to send data to the processing device 30 and to facilitate the user to input data (e.g. with a keyboard, mouse, touchscreen, etc.).

In a step R6, the processing device 30 receives the node identification data provided by the user and completes the registration process 1100. The processing device 30 can store the node identification data for each registered user in a communication system database 3100 (see FIG. 1a). The processing device 30 can add the newly registered user in the network of members 2 (see, e.g., FIG. 2a).

In step R6, the processing device 30 can add a seed member (e.g. user B) without any connections and a descendant member (e.g. user B) with a connection with the member that invited the user in step R1. However, the members (seed or descendant) can connect with other members of the communication system 1 through a member connection process (illustrated in FIG. 1c).

In some embodiments, the processing device 30 can be configured to generate and/or update the network(s) of member 2 (see FIG. 2a). The update of the network of members 2 can be triggered by a user completing the registration process 1100, by a user connecting with another user, by a user providing an evaluation of a connection with another user (e.g. inputting a node proximity 60, see FIG. 1c).

For example, the processing device 30 can generate graphs 2 to represent the network of members 2.

Each seed member can be added to the network of members 2 as an isolated node. Through a member connection process (illustrated in FIG. 1c), the seed member can be connected with other nodes on the network of members 2 hence seizing of being an isolated node.

Each descendant member can be added to the network of members 2 as a descendant node (i.e. "child" node) of the inviter node that invited the descendant member. The inviter node can be a seed member or a descendant member. The descendant members can thus be added to the network of members 2 as comprising only one connection (the one with the inviter node) and can increase the number of connections with other nodes through a member connection process (illustrated in FIG. 1c).

In some embodiments, the processing device 30 can generate and assign a membership data structure 1150, also referred as membership number 1150, to a registered member. The membership number 1150 can facilitate recording the history of how a user became a member and can also facilitate generating the network of members 2. The membership number 1150 can comprise a seed sequence number 1152, a descendant level 1154 and a level counter 1156B.

The seed sequence number 1152 can be a counter that increments each time a seed member joins the communication system 1 and is assigned to that seed member.

The descendant level 1154 specifies the descendance level of a node. That is, a seed member can comprise a descendant level of zero. Further, a descendant node that is invited by a seed member can comprise a descendant level of one. Further still, a descendant node that is invited by a descendant member with descendance level of one can comprise a descendant level of two. In general, the descendant level 1154 of a node can be zero if the node is a seed member and otherwise can be one level higher than the descendant level 1154 of the inviter node.

The level counter 1156 can be configured to count the number of nodes with the same sequence number on a specific level (i.e. with same descendance level). Hence, one seed level the level counter can be no more than one (there cannot be two seed members with the same seed sequence number).

For example, user B (who becomes a seed member) can be assigned the membership number 1150B with the following fields: S150-D0-001. That is, the seed sequence number is 150, the descendant level is 0 and level counter is 1. This can be interpreted as user B being the 150th seed member of the system, comprising a descendance level of 0 (since it is a seed member) and a level counter of 1.

User A (who becomes a descendant member) can be assigned the membership number 1150A with the following fields: S002-D1-005. That is, the seed sequence number is 2, the descendant level is 1 and level counter is 5. This can be interpreted as user A being invited by the seed member (since the descendant level is 1) with seed number 2 (since the seed sequence number is 2) and there are at least 5 descendant members (since the level counter is 1) on level 1 branching directly from the seed member 2.

The membership number 1150 can also comprise an inviter pointer filed (not shown) which can point to the member by whom the node was invited. For a seed member, the inviter pointer field can be null. For a node with descendant level of 1, the inviter node can be inferred by checking the seed sequence number 1152 of the membership node. For a node with descendant level of 2 or more, ambiguity of inferring the inviter node exists, which can be solved by using the inviter pointer field.

Hence, with this configuration of the membership number 1150 it can be easily determined (e.g. by the processing device 30) how far any two nodes can be from each other, how many seed members are present, how many nodes are there for each seed on each descendant level etc.

The membership number 1150 can be stored for each member on the communication system database 3100 (see FIG. 1a).

It should be noted that the above nomenclature and configuration used for the membership number 1150 is provided for illustrative purposes only and is not limiting thereof.

Figure 1C:
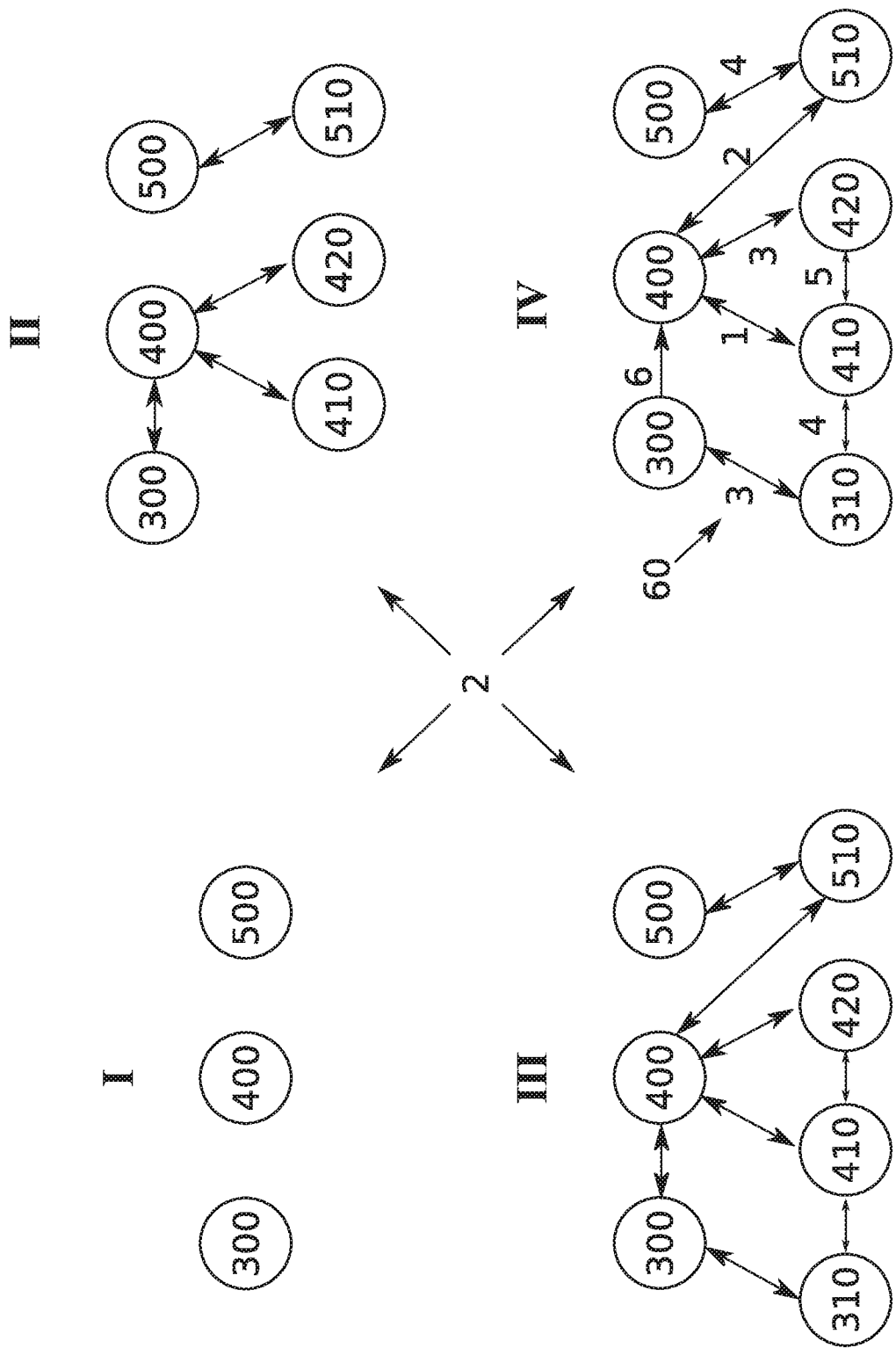
FIG. 1c illustrates the generation and updating of a network of members of a communication system.

FIG. 1c illustrates the generation and updating of an exemplary network of members 2. The updating of the network of members 2 can be triggered at the completion of a registration process 1100 or member connection process.

The connections can be created between any two members. In some embodiments, different levels of connections can be considered.

Direct connections (or level one connections) may exist between two nodes that are directly connected with one another. A member of the communication system 1 can send a connection request to at least one other member of the communication system 1. That is, the communication system 1 can provide an option that can allow its members to send a connection request to other members of the communication system 1. Further, the communication system 1 can allow its members to receive connection requests and can provide to them with an option of either accepting or rejecting a connection request. Upon accepting a connection, preferably a bidirectional connection, can be generated between the two members. That is, the processing device 30 can connect the two members in the network of members 2.

Upon rejection of a connection request, the connection between the two members is not established. In some embodiments, upon rejection of a connection request, a unidirectional connection can be established from the member that sent the invitation to the member receiving (and rejecting) it. A unidirectional connection from a user A to a user B can be interpreted as user B being able to view communication objects 3010 (see FIG. 4) created by user A, but not vice versa.

Direct connections between two members can also be established when a member invites another unregistered user to become a member of the communication system 1. If the invited member registered utilizing the invitation from the inviter member, a direct connection can automatically be established between the inviter node and the invited node.

Indirect connection (level two connections) may exist between two nodes that comprise a direct connection with at least one other node. Similarly, level three connections may exist between two nodes if the two nodes comprise a level two connection with a common node. In a similar manner, four, five or more level connections may exist between two members.

The connections between nodes and the respective connection level may be calculated or determined by the processing device 30. That is, a node may create (or trigger the creation) of only first level connection through connection requests and/or invitations to register. The processing device 30 can evaluate the process of connection requests and invitations to register and can establish direct connections between nodes when applicable (e.g. upon acceptation of a connection request). Thus, the processing device 30 may generate and update a network of members 2, wherein nodes representing members of the communication system 1 can be linked (like in a graph) with each other representing connections between the members.

The processing device 30 may process the network of members 2 and may determine second, third, fourth, fifth or more level connections that a node may comprise. In some embodiments, the nodes and the respective level connections with such nodes may be provided to a user.

FIG. 1c illustrates the establishing of connection between members through an exemplary network of members 2.

At a first instant I, nodes 300, 400, 500 can become members of the communication system 1 (e.g. through the registration process 1100, see FIG. 1b). In this example, nodes 300, 400, 500 are seed members since they have no connections with other nodes (e.g. they are registered independently without any invitation).

At a second instant II, node 400 may invites (e.g. sends a personalized registration link PRL, see FIG. 1b) to nodes 410 and 420. Hence, nodes 410 and 420 are added to the network of members 2 as descendant nodes from node 410 and 420 and a connection is added (by the processing device 30) between nodes 400 and 410 and nodes 400 and 420 in the network of members 2. Similarly, node 500 invites node 510 and a connection is added between the two in the network of members 2.

Further, node 300 can send a connection request to node 400. Node 400 can accept or reject the connection request. In the depicted example, node 400 accepts the connection request and a connection is created between the nodes.

That is, a connection can be established through a member connection process. The member connection process can be carried out in several ways. A member may send a registration request to an unregistered user (see step R1 in FIG. 1b). If the unregistered user becomes a member using the registration request (e.g. PRL), the said member can automatically be connected with the inviter member. Alternatively, a member can send a connection request to another member. Upon reception of the connection request a connection between the two members can be established. In some embodiments, if the member that receives the connection request does not accept the connection request than a unidirectional connection can be established, i.e. the member that gets invited may have the rights to participate in a communication generated by the member that invites but not the other way around.

In a third time instant III, the network of members evolves even further reflecting the dynamics of connection creation/addition between members of the communication system 1. The processing device 30 can track the creation of member connections and addition of new members and can reflect those to the network of members 2.

In a fourth time instant IV, the connections may be evaluated—i.e. assigned a node proximity 60. That is, in some embodiments, direct connection may be differentiated. For example, a direct connection with a family member may comprise a better score (i.e. considered as a stronger connection) than a direct connection with an acquittance.

The differentiation of direct connections can be achieved by assigning a node proximity 60 to the direct connections. The node proximity 60 may be input by the nodes during the connection creation and/or may be set or adjusted at a later time after the connection creation process. That is, a node may be provided with the option of evaluating or scoring its connections.

In other embodiments, the node proximity 60 can be automatically assigned to direct connections by the processing device 30. For example, the processing device 30 can generate a node proximity 60 between two directly connected members by taking into consideration the relation between members (e.g. family members, friends, etc.,) said relation being input by the at least one of the nodes. The processing device 30 may consider a history of communication between the two directly connected members (i.e. number of communications, success or fail of previous communications, etc.,) while generating the node proximity 60 of the two members.

However, as the process of automatically assigning node proximity 60 to direct connection may be prone to errors, a node may be provided with node proximity 60 and may adjust the value of the node proximity 60 of its connections.

A node proximity 60 may be represented with levels, e.g. "weak", "moderate", "strong" (see FIG. 3*c*) or by discrete numbers, e.g. "1", "2", "3" (see FIG. 1*c*-IV or FIG. 3*b*) or may be represented by a continuous score in an interval of values: e.g. any number in the interval [1:3].

Figure 2:
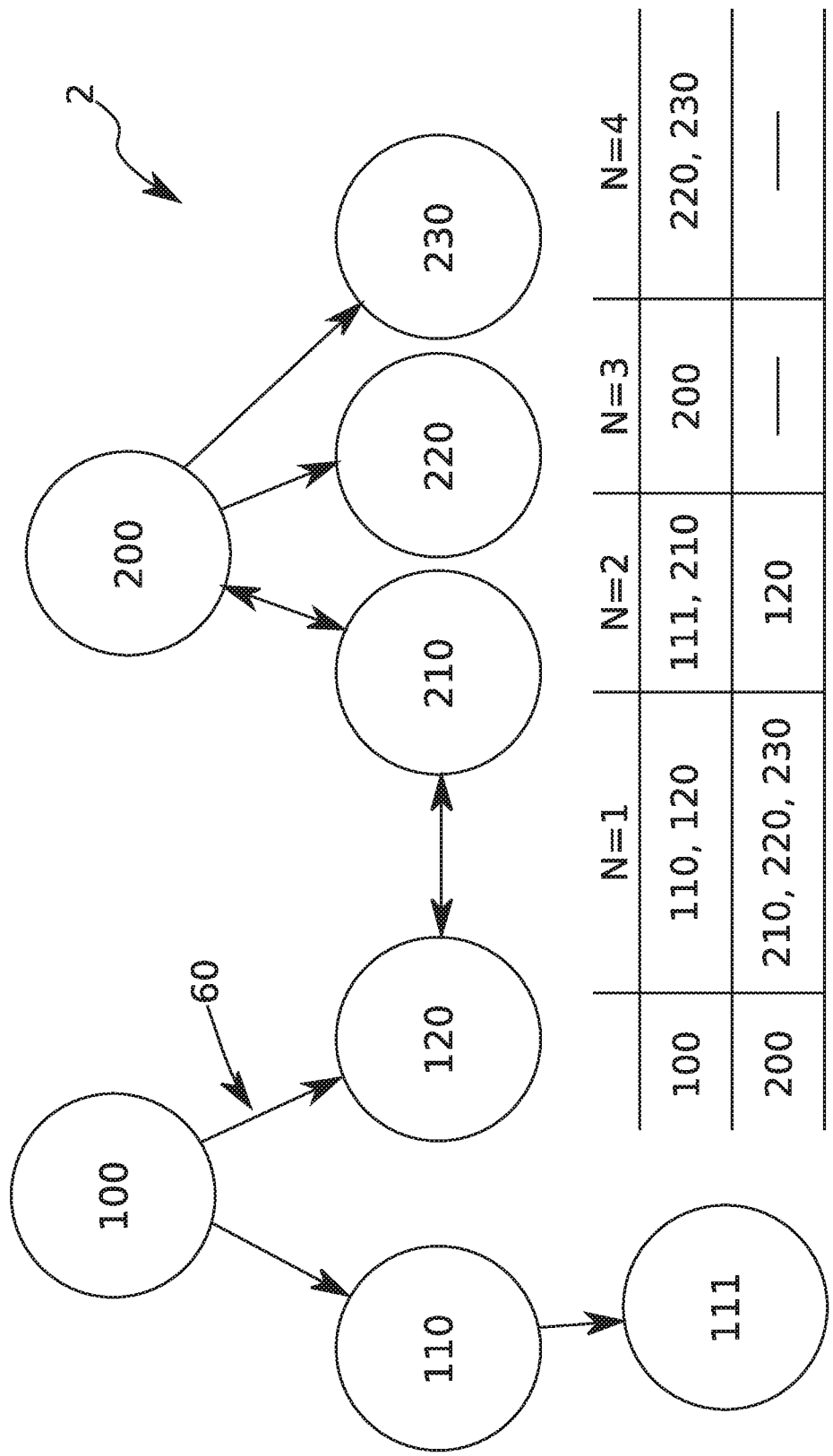
FIG. 2 depicts a first exemplary network of members of the communication system.

FIG. 2 depicts an exemplary network of members 2 of the communication system 1. The communication system 1, more particularly the processing device 30 can be configured to organize the members into network(s) of members 2, such as the one depicted in FIG. 2 (see also FIGS. 1*c* and 3*a* to 3*c* for further examples).

The network of members 2 can be configured as a graph 2. Each member can be represented by a node on the graph 2. Each node can comprise node identification data. The node identification data can comprise a pointer to a unique member (i.e. more particularly to data structures facilitating the representation of a member on the communication system 1). The node identification data (and/or the data structures facilitating the representation of a member on the communication system 1) can comprise name, surname, username, email, address, unique identifier and/or other information or personal information related to the member of the communication system 1. Said information regarding a member of the communication system 1 can be obtained through a registration process 1100 (see FIG. 1*b*) wherein an unregistered user can become a member of the communication system 1.

Each node can further comprise node network data. The node network data can comprise information related to the connections of the node. For example, the node network data of node 100 is depicted by the second row of the depicted table in FIG. 2 and the node network data of node 200 is depicted by the third row of the depicted table in FIG. 2, although this is simply exemplary.

Put simply, node network data of a node can specify with each other nodes a node is connected. In the example of FIG. 2, node 100 is directly connected with nodes 110 and 120, comprises a second level connection with node 111 (through node 111) and node 210 (through node 120), further comprises a third level connection with node 200 (through nodes 120 and 210) and a forth level connection with nodes 220 and 230 (through node 120, 210, 200). For example, such information can be comprised in the node network data of a node specifying its direct (and further level) connections. Preferably, the information regarding a node's connections can be encoded on a data structure comprised in the node network data.

Members of the communication system 1 can be connected with each other through a member connection process (discussed in FIG. 1*c*). The connection between members can be represented on the network of members 2 by an edge (e.g. edge 100-110). The edge between nodes (i.e. representation of member connections) can be facilitated by a metric 60, referred as a node proximity 60.

The node proximity 60 can be a binary metric (i.e. only takes two values, e.g.: 0 or 1, yes or no, connected or not-connected). For example, the network of members 2 of FIGS. 2 and 3*a* comprises a binary node proximity 60, as two nodes can either be connected or disconnected.

Alternatively, the node proximity 60 can be a connection score 60 (or rating 60). That is, the node proximity 60 can be configured to not only indicate whether two nodes are connected or disconnected (as a binary node proximity does) but to also rate the connection between the two nodes by assigning a connection score 60 to a connection. For example, the network of members 2 depicted in FIGS. 3*b* and 3*c* comprises for each of the connections (i.e. edges on the graph) a connection score 60. In this manner, the node proximity 60 can facilitate ranking the connections based on their connection score 60.

That is, a binary node proximity 60 can allow only different level connections to be differentiated. That is, a directly connected node can be considered as comprising a higher proximity then an indirectly (level 2 or more) connected node. For example, in FIG. 2 node 110 is closer to node 100 than node 210 is. However, proximity of nodes 110 and 120 cannot be differentiated with the binary node proximity 60 of FIG. 2.

Alternatively, a non-binary node proximity 60, as depicted in FIGS. 3*b* and 3*c*, can allow same level nodes to be differentiated. For example, in FIG. 3*b*, node 110 and node 120 are both directly connected to node 100. However, based on the node proximity 60, the node 110 (with a node proximity value of 1) is more proximal to node 100 than node 120 is (with a node proximity value of 10). In this example, small numbers are assigned to higher proximities.

In other words, the network of members 2 can be implemented as a labeled graph 2, wherein each branch (i.e. edge or connection) can be labeled with node proximity 60. The node proximity 60 can indicate the nature or quality of connections in a network of members 2. One example of node proximity 60 that can be used can be: connected, not connected. Another example can be: best, good, moderate, bad, worse. The node proximity 60 can comprise or be a numerical value 60 or numerical weight 60 or score 60. In the particular instance depicted in FIG. 3*b* and FIG. 3*c*, the network of members 2 can be implemented as a weighted graph 2 (i.e. a graph wherein each branch is assigned a numerical weight).

The node proximity 60 can be an integer, or generally a real number. The node proximity 60 can comprise a minimum value it can take. The node proximity 60 can alternatively or additionally comprise a maximum value it can take. In other words, the node proximity 60 can take value from a predetermined interval, wherein one of the interval's endpoints can indicate the best score and the other endpoint can indicate the worst score and the numbers within the two endpoints indicate intermediate scores depending on their proximity to the endpoints. It can be understood, that the choice of the interval and or the assigning of endpoints to best/worst scores can be arbitrarily selected as long as it is coherent throughout the graph.

As discussed, the node proximity 60 can be assigned to edges (connections) on the graph 2, i.e. connections between the nodes (members) on the network of members 2. In other words, the node proximity 60 is not assigned to members per se, i.e. does not rate members, but instead the connections between the members. In this regard, the node proximity 60 can be asymmetric. That is, the connection from a first node to a second node can comprise a different node proximity 60 compared to the connection from the said second node to the said first node. One example of an asymmetric connection are unidirectional connections. As depicted, in the network of members 2 depicted in FIG. 2, there exist a connection from node 100 to 110, but there exists no connection from node 110 to 100. Note that, the connection is indicated by an arrow. The direction of the arrow indicates where the connection exists (i.e. similar to the indication of connections in a directed graph). That is, the node proximity 60 of the connection 100-110 (i.e. from node 100 to node 110) can comprise a value of 1 (or connected) while the reverse direction 110-100, i.e. from node 110 to node 100, can comprise a value of 0 (i.e. not connected). Further asymmetrical connections can be seen on FIG. 2 between nodes 100-120, 110-111, 200-220, 200-230. The asymmetrical connections can also exist when a non-binary node proximity 60 is used. In these embodiments, different node proximities 60 can be assigned to different directions of a connections. For example, an exemplary user A may rate a connection with user B as "STRONG" (or any other score), while user B may rate the connection with user A as "MODERATE" (or any other score).

The node proximity 60 can also comprise the same value for both directions of the connections, i.e. symmetrical connections can exist between two members. For example, connections between nodes 120-210 and 200-210 are symmetrical connections. Similarly, connections in the network of members depicted in FIGS. 3*a* to 3*c* are symmetrical.

The network of members 2 can alternatively or additionally, be generated or represented in a tabular form (e.g. as indicated by the respective tables of FIG. 2*a*). The tabular form can be advantageous as it can be efficiently generated and/or processed by processing units, such as, the processing device 30 of the communication system 1 depicted in FIG. 1*a*. Other representations or means of encoding the network of members 2 can also be used without significantly altering the object of the current invention.

FIG. 3*a* depicts an example of a hierarchically organized network of members 2 that does not weigh the connections or the edges, i.e. the node proximity 60 can comprise a binary value, that is, either two nodes are connected or disconnected. Furthermore, all edges are bidirectional, i.e., all connections are mutual, that is, the node proximity 60 is symmetrical.

Starting from each of the nodes on the network of members 2 different node levels or levels of connections can be identified. The first node level with respect to a starting node can be defined by the direct connections of the starting node. The second level of connections with respect to a starting node can be defined as the connections of the first level nodes, and so on. For example, starting from node 100 the first level nodes of node 100 are nodes 200, 110 and 120 defined respectively by the direct connections 100-200, 100-110 and 100-120. The second level nodes with respect to node 100 are nodes 111/221, 210, 220 and 230 defined respectively by connections 100-110-111/221, 100-200-210, 100-200-220 and 100-200-230. Third level nodes include 111/221 as it can also be reached by a second path: 100-200-220-111/221.

A communication between a first node and a second node can take place according to conditions determined based on the level of the second node with respect to a starting node. For example, the communication of a starting node with its first level nodes can take place with more favorable conditions compared to the communication of the starting node with its second level nodes. For example, node 110 can communicate with node 100 with more favorable conditions than node 210. Nodes 110, 120 and 200 can communicate with node 100 with same conditions. Node 111/221 (which is both a 2nd level node and a 3rd level node with respect to node 100) can communicate with node 100 according to 2nd level conditions (i.e. most favorable ones). The conditions on which a communication between two nodes can take place, as discussed in more detail with respect to FIG. 4, can further be regulated by a calculation of a communication score 3500 and comparing the communication score 3500 with at least one communication threshold 3012. As discussed in detail in FIG. 5, the communication score 3500 can depend on the connection level between the nodes, more particularly on the node proximity 60 of the nodes.

FIG. 3*b* depicts the example of network of members 2 of FIG. 3*a*. However, the node proximity 60 used in the network of members 2 of FIG. 3*b* is not a binary metric (as in FIG. 3*a*) but instead a numerical value. That is, each connection on the network of members of FIG. 3*b* is weighted by a respective score 60 (expressed as an integer number). In this example, a lower score 60 indicate higher proximity (i.e. stronger connection) while a higher score 60 indicate a lower proximity (i.e. weaker connection). Intuitively, in this example, the node proximity 60 of the connection is expressed by a "cost" (or a "distance") assigned to the connection.

As discussed with respect to FIG. 1*c* the node proximity 60 of a direct connection can be input by a user or can be automatically set by the processing device 30. The user can be provided with the option of updating (i.e. re-adjusting) the node proximity 60 of its connections.

The node proximity 60 between a starting node and 2nd or more level node with respect to the starting node can be calculated by adding the node proximity 60 of the connections forming the path from the starting node to the other node. For example, node 230 is a 2nd level node of node 100. Thus, the node proximity 60 of nodes 100 and 230 is 3 (communication score of connection 100-200 plus communication score of connection 200-230). Other examples on calculating the node proximity 60 of indirect connection are depicted in FIG. 3b. The calculation of the node proximity 60 of indirect connections can preferably be carried out by the processing device 30 (see FIG. 1a).

If two or more paths exist between two nodes, then the node proximity 60 of the two nodes can be set according to the path indicating the strongest proximity. For example, node 111/121 is connected with node 100 via node 110 and also via nodes 220 and 200. Via node 110, node 111/221 is a second level node of node 100. Via nodes 220 and 200 node 111/221 is a third level node of node 100. Nevertheless, the later path (i.e. via 220 and 200) indicates a stronger proximity (i.e. comprises a smaller node proximity value compared to the node proximity value of the other path), even though through this path node 111/221 is a third level node instead of a second. Hence the node proximity between node 100 and 111/221 is set to be -2 according the connection 100-200-220-111/221.

FIG. 3c indicates a similar network of members 2 with the one depicted in FIG. 3a, however the node proximity 60 is configured as a label 60 instead of a numerical value.

FIG. 4a depicts a flowchart of a communication process according to an embodiment of the present technology. The communication process can be carried out by utilizing the communication system 1 depicted in FIG. 1a.

At least one first node 100 (also referred as first user 100 or first member 100) can create at least one communication object 3010. That is, the first node 100 is the initiator (i.e. starting node) of the communication 3010. In one example, the first node 100 can be a registered user of the communication system 1 (see FIG. 1a) and can create the communication object 3010 using a first system accessing component 10 (see FIG. 1a). In other words, the first node 100 can "post" the communication object 3010 on the communication system 1. In some embodiments, the at least one first node 100 can be required to be a registered member before creating the communication object 3010.

In general, the communication system 1 can be configured to allow any member of the system to generate a communication object 3010. The node generating the communication object 3010 is referred throughout the description (for sake of clarity) as a first node 100 (or first user 100 or first member 100). The other nodes that can participate in the created communication object 3010 are referred herein as second nodes 200 (or second users 200 or second members 200). Still other nodes of the communication system that can be connected to either the first node or the second node can be referred as third nodes.

The communication system 1 can be used as a platform for offering temporary accommodation. In such embodiments, the communication object 3010 can comprise an offer for accommodation 3010. Thus, members of the communication system may create offers for accommodation 3010 (hence acting as first users 100, or hosts 100) and may send requests to an already posted offer for accommodation 3010 (hence acting as second users 200, or clients 200).

The communication object 3010 may be an offer for temporary accommodation, such as, a holiday apartment, guest room, guest bed, etc.

In other embodiments, the communication object 3010 may include offers for rental of other tangible assets, such as, car, vintage-cars, boats, general equipment, sporting and outdoor equipment, tools, children/baby equipment, senior equipment or equipment for persons with special needs etc.

In further embodiments, the communication object 3010 may comprise offers for sale of tangible (used) products, such as, car, vintage-cars, boats, general equipment, sporting and outdoor equipment, tools, children/baby equipment, senior equipment or equipment for persons with special needs, excess tickets for concerts or theatres, etc.

In yet further embodiments, the communication object 3010 may include the offering or recommendation of services, such as, cleaning, driving, babysitting, housekeeping, craftsmen, plumber, artisans, or financial services, such as loans, guarantees or insurances, etc.

It will be understood that in the above some exemplary contents of a communication object 3010 are discussed. It is not to be interpreted as an exhaustive and limiting list of contents of a communication object 3010.

The communication object 3010 can comprise communication conditions 3011. The communication conditions 3011 can comprise a set of rules on how the communication 3010 can be carried out. The communication conditions 3011 can also comprise a description of the respective communication object 3010 (e.g. title section, description section).

As discussed, the communication object 3010 can be, e.g., an offer for accommodation 3010 posted by a node 100. In this example, the communication conditions 3011 can comprise a description of the accommodation, address, size, availability dates, price etc.

In some embodiments, the communication conditions 3011 can comprise different levels of conditions. That is, for an offer for accommodation (or renting or selling or service-offering in general) the communication conditions 3011 may comprise multiple prices and/or priorities and/or service levels specified therein. The communication object 3010 (i.e. renting, selling, service-offering) can take place between the first user 100 and the second user 200 according to one of the specified prices in the communication conditions 3011. The selection of the price and/or priority and/or service level (from the multiple prices and/or priorities and/or service levels provided in the communication conditions 3011) can be done based on a communication score 3500, which will be discussed in more detail below.

Additionally, the communication object 3010 can comprise communication threshold parameters 3012 that can comprise at least one communication threshold 3012. The communication threshold 3012 can be automatically set (e.g. by the communication system 1, particularly by the processing device 30, see FIG. 1a). Alternatively or additionally, the communication threshold can be manually set and/or adjusted by the first node 100 that created the communication 3010. The first node 100 can comprise "administrator rights" to the communication object 3010.

The communication threshold 3012 can define different communication modes for carrying the communication 3010. A communication mode refers to a particular selection of communication conditions 3011, if multiple communication conditions 3011 are comprised by a communication object 3010. More particularly, at least one communication threshold 3012 preferably a plurality of communication thresholds 3012 can be used to define at least two modes of carrying out the communication 3010.

For example, a communication threshold 3012 can be used to determine whether the respective communication object 3010 can take place or not. In yet another example, two communication thresholds 3012 can be used to define three different modes of carrying out the communication object 3010, such as, no-communication, communication with moderate communication conditions 3011 (e.g.

medium price or through a negotiation process), communication with best communication conditions 3011 (e.g. low price or directly without negotiation process).

The communication object 3010 can be stored in a communication system database 3100. In some embodiments, a member of the communication system 1, such as, a first user 100 can access the communication system 1 using a system accessing component 10 (see FIG. 1*a*) and can create a communication object 3010, which can be transferred to the communication system database 3100 and can be stored therein.

The communication system database 3100 can also comprise stored therein information related to members of the communication system 1. That is, the communication system database 3100 can comprise node identification data for the members of the communication system 1 (see FIG. 1*a*). The node identification data (and/or the data structures facilitating the representation of a member on the communication system 1) can comprise name, surname, username, email, unique identifier and/or other information or personal information related to the member of the system.

One or more second nodes 200 can search for a communication object 3010. That is, the at least one second node 200 can assess the communication system 1 (see FIG. 1*a*) using a system accessing component 10 and can provide at least one communication searching criteria 2020, such as, at least one keyword 2020. The communication searching criteria 2020 can comprise descriptions of a communication object 3010 with which the second node 200 may intend to interact with. For example, the communication searching criteria 2020 can comprise at least one communication condition 3011, e.g. price, availability, size, place, etc., wherein the said communication condition 3011 comprised in the searching criteria can be a preferred condition of the second user 200 for carrying out a communication object 3010.

Thus, the process described in FIG. 4*a* can be referred as a "pull-based" offer. That is, it is a second node 200 itself that searches for a communication object 3010 which can then, based on searching criteria 2020 and communication score 3500, be provided to the second node (in step 3900) or not (step 3999). This differs from the "push-based" process which is discussed in FIG. 4*b* wherein the communication objects 3010 can be automatically provided to the second users 200 based on communication score 3500.

For example, in a temporary accommodation offer platform 1 (i.e. the communication object 3010 comprise temporary accommodation offers 3010), a second user 200 (i.e. a client 200) may intend to rent an accommodation 3010. For this, the second user 200 can access the communication system 1 (i.e. temporary accommodation offer platform) and can search for suitable temporary accommodations. The second user 200 may specify his/her needs or requirements by inputting the communication searching criteria 2020, which may comprise preferred address, dates, price range, size of accommodation facility etc. For example, the searching criteria 2020 may comprise the keywords "one bedroom", "city center", "one weekend", etc. The searching criteria 2020 may also be provided by the second node 200 selecting an option (from multiple provided options), e.g. a date or range of dates.

In a communication searching process 3210, the communication objects 3010 that may be stored in the communication system database 3100 can be searched. For example, the communication searching criteria 2020 provided by the second node 200 can be compared with the communication object descriptions (such as: communication conditions 3011 and communication threshold 3012) during the communication searching process 3210 to yield a match ("Y" path from the communication searching process 3210) or a mismatch ("N" path from the communication searching process 3210).

Thus, through the searching process 3210 all communication objects 3010 stored in the system database 3100, preferably all active communication objects 3010 may be searched. That is, the communication objects 3010 stored in the communication system database 3100 can be compared against the communication searching criteria 2020. This process can filter (i.e. by not providing to the second user 200) the communication objects 3010 that do not match with the searching criteria 2020. For such communication objects 3010 that do not match with the searching criteria 2020, the search process 3210 terminates through the N-path followed with the End process 3999.

Hence, communication objects 3100 that do not fulfill the communication searching criteria 2020 may not be shown to the second user 200 as they can be filtered by the searching process 3210. This can be advantageous as it lowers the probability of providing irrelevant communication objects 3010 (i.e. communication objects 3010 that the second user 200 does not intend to interact with) to the second user 200.

If however, the communication searching criteria 2020 match the description of a communication object 3010 the searching process 3210 for such communication objects 3010 can continue to a communication score calculation process 3300 (as depicted by the Y-path from the searching process 3210). That is, for all the communication objects 3010 which description (e.g. communication conditions 3011) matches the communication searching criteria 2020, the communication score calculation process 3300 can be triggered.

The communication score calculation process 3300 (see also FIG. 5) can be configured for calculating the communication score 3500 between the first node 100 and the second node 200 for a communication 3010. That is, the communication score calculation process 3300 can output a communication score 3500 by taking into consideration node data of the first node 100, node data of the second node 200, communication object 3010 and optionally external data from an external database 3200. The communication score calculation process is discussed in more detail with respect to FIG. 5.

Thus, during the communication score calculation process 3300, the internal data comprised in the communication system database 3100 can be utilized. Additionally, external data stored in an external database 3200 may be used. The external database 3200 can be a database that is not part of the communication system 1. The external data from the external database 3200 may, for example, comprise an external network of members (not shown) or any other public database.

An exchange of data can be carried out between the communication system 1 (e.g. internal database 3100) and external databases 3200. Data from external sources 3200 may be imported 3221 during the communication score calculation process 3300. The data imported 3221 from external databases 3200 may also be stored in the communication system database 3100. The exchange of data between the communication system internal database 3100 with the external database(s) 3200 may be regulated by privacy regulations and laws.

The calculated communication score 3500 can also be exported 3222 to external databases 3200. That is, external databases 3200 may be provided with the communication score 3500 between any two members of the communication system 1.

Thus, through process 3300 (or step P1 in FIG. 4b) the communication score 3500 can be calculated for each communication 3010 (i.e. depends on the communication object 3010). Further, between two members the communication score 3500 can be different based on the communication 3010. In other words, the communication score 3500 between two nodes can be calculated based on the respective communication object 3010 that can take place between the nodes. Hence, the communication score 3500 can be an instant metric as it depends on an instant communication object 3010 (i.e. is not fixed between two nodes, but instead is calculated for each communication that can take place between the two nodes).

The communication score 3500 can further be recalculated on at least one further instant of time after the instant of time the communication score 3500 is first generated. That is, the communication score 3500 is not static, but can change over time and be updated. The recalculation of the communication score 3500 can be carried out based on or triggered by new information that at least one of the members (i.e. the first node 100 or the respective second node 200) can add. For example, a member can update or append new information on the respective node data and based on this new information the communication scores 3500 assigned to two members for a specific communication object 3010 can be updated. In yet another example, the information related to the communication object 3010 can be updated or extended. This can trigger a recalculation of the communication scores 3500.

Further, the communication score 3500 is relational. This means that the communication score 3500 does not express a rating of individual nodes independently, but instead reflects a score of their relation or connection with respect to a communication object 3010 (e.g. how much can the first node 100 trust the second node 200 to offer his/her accommodation depicted in an accommodation offer 3010).

Further still, the communication score 3500 can be asymmetric. That is, for the same type of communication object 3010 the communication score 3500 when a user A is the first user 100 (i.e. the host) and a user B is the second user 200 (i.e. the client) can be different than the communication score 3500 when the roles are reversed, i.e. when a user B is the first user 100 (i.e. the host) and a user A is the second user 200 (i.e. the client). For example, user A when offering to rent his/her apartment can trust user B more, then user B when offering his/her apartment to user A. Thus, in the two exemplary cases the communication score 3500 calculated between users A and B can differ.

The calculated communication score 3500 can further be utilized for determining whether and how the communication 3010 can take place between first node 100 and second node 200. As discussed, a communication object 3010 can comprise communication conditions 3011 and communication thresholds 3012. The communication conditions 3011 and communication thresholds 3012 can be further used for determining if and how the first node 100 and the second node 200 can carry out the communication 3010.

In FIG. 4a, the communication score 3500 is compared against three communication thresholds L1, L2 and L3 during communication score evaluation processes 3510, 3520 and 3530. In a communication threshold evaluation process 3510, 3520 and 3530, the communication score 3500 can be compared with (e.g. checked if it is smaller than) a certain communication threshold 3012. For sake of clarity, the communication threshold 3012 used in the communication threshold evaluation process 3510 will be referred as L2, the communication threshold 3012 used in the communication threshold evaluation process 3520 will be referred as L1 and the communication threshold 3012 used in the communication threshold evaluation process 3530 will be referred as L3. L1 is smaller (i.e. "better") than L2 and L2 is smaller (i.e. "better") than L3. The values of L1, L2 and L3 can be specified in the communication threshold 3012 of the respective communication object 3010.

Hence, if in the communication threshold evaluation process 3510 it is determined that communication score 3500 is smaller than L2 (Y-path), then communication threshold evaluation process 3520 takes place. Otherwise (N-Path) communication threshold evaluation process 3530 takes place.

If in communication threshold evaluation process 3520 it is determined that the communication score 3500 is smaller than L1 (Y-path), then the communication 3010 can take place successfully 3900 between nodes 100 and 200.

Note that the communication 3010 can take place according to the most favorable mode (i.e. according to the best communication conditions 3011) if the communication score 3500 is smaller than L1. The most favorable mode may comprise the following advantages (but not limited to): the communication object 3010 being provided to the second node 200, the second node 200 being able or provided with the rights to participate or interact through the communication object 3010 with the first node 100 (e.g. request to rent or buy), the second node 200 not needing the consent of first node 100 to participate or interact in the communication 3010 with the first node 100 (e.g. can book instantly), the second node 200 being provided with the most favorable communication conditions 3011 (e.g. lowest price, best service level, etc.).

That is, in this example a very small communication score 3500 (smaller than minimum threshold L1, i.e. a "very good" communication score 3500) can be used (e.g. by the processing device 30) to determine that the first node 100 and second node 200 are very close to each other (or that first node 100 trusts second node 200). As a result, the processing device 30 (see FIG. 1a) may allow the communication 3010 to take place between the nodes directly, with favorable conditions 3011 and with less or no restrictions.

If otherwise, in communication threshold evaluation process 3520 it is determined that the communication score 3500 is not smaller than L1 (N-path) the communication 3010 can take place in moderate communication conditions 3011. The moderate communication conditions 3011 may comprise further restriction before the communication can take place (as compared to the above case when communication threshold was smaller than L1). Said restrictions may comprise a consent request process 3600, wherein the second node 200 can be provided with the communication object 3010 (i.e. can view communication object 3010), however the second node 200 can only partially interact with the communication object 3010.

That is, if the communication score 3500 is between the thresholds L1 and L2, a moderate closeness may be determined (e.g. by the processing device 30, see FIG. 1a) between the first node 100 and second node 200. In some embodiments, when the communication score 3500 is between the thresholds L1 and L2 the consent request process 3600 may be initiated. In a consent request process 3600, the communication object 3010 can be provided to the second user 200, however the second user may not be provided (e.g. by the processing device 30, see FIG. 1a) with the rights of communicating through communication object 3010 with first user 100. However, in a consent request process 3600 the second user 200 may request to interact through communication object 3010 with the first user 100.

Put simply, in contrast to the case when communication score 3500 is smaller than L1 which can allow the second user 200 to directly communicate with the first user 100, when the communication score 3500 is between thresholds L1 and L2 the second user 200 can interact with the first user 100 only with the consent of the first user 100. Said consent from the first user 100 can be requested by the second user in the consent request process 3600.

In a consent evaluation process 3610, the first node 100 may accept or reject the request of second node 200. If the first user 100 accepts the request (Y-path) the communication 3010 can take place successfully 3900. However, the communication 3010 may take place according to moderate communication conditions 3011 (i.e. not with the same "best" conditions as when the communication threshold is smaller than L1). However, this may require that the different communication conditions 3011 be provided by the first user 100.

If in 3610, the first node 100 does not provide the consent to the second user 200 to interact in communication 3010, the communication 3010 cannot take place and the communication process terminates at the End process 3999.

If in communication threshold evaluation process 3530 it is determined that the communication score 3500 is not smaller than L3 (N-path) the End process 3999 takes place. Thus, if the communication score 3500 is larger than L3, the communication 3010 cannot take place between the first node 100 and second node 100. For example, the processing device 30 can determine that the first node 100 and the second node 200 are not close to each other and thus cannot be involved in the communication 3010 with each other.

That is, if communication score 3500 is larger than L3, the communication object 3010 is not provided at all to the node 200 (even though a matching between the communication searching criteria 2020 and the communication 3010 was found during communication searching process 3210). Put simply, the communication score 3500 may indicate that nodes 100 and 200 are not proximal and thus the second node 200 can be determined to be non-eligible to participate in communication 3010 with the first node 100.

If otherwise, in the communication threshold evaluation process 3530 it is determined that the communication score 3500 is smaller than L3 (Y-path), that is, L2<CS<L3, further restrictions as compared to when CS<L1 or L1<CS<L2 may be imposed. Note that CS refers to communication score 3500.

In other words, if CS<L1 the second user 200 can be provided with the communication object 3010 and can directly interact with it without the consent from first user 100 (i.e. without restrictions). Further, the best communication conditions 3011 may be selected for carrying out the communication 3010.

If L1<CS<L2, the second user 200 can be provided with the communication object 3010, however the second user 200 cannot directly interact with the first user 100. The second user 200 may be provided with a consent request option 3600, wherein the second user 200 may request the consent of the first user 100. The first user 100 may be prompted to provide or not the consent to the second user 200 in a process 3610. The communication 3010 can take place only if first user 100 accepts the request of second user 200. Further, moderate communication conditions 3011 may be selected for carrying out the communication 3010.

If L2<CS<L3, the second user 200 can be provided with the communication object 3010 however can neither directly interact with the first user 100 nor send a request to interact to the first user 100. In such cases, the second user 200 may be provided in a process 3700 with the option of requesting at least one third user 210 (see e.g. FIG. 2, wherein the second node 200 is directly connected to the third node 210) for an introduction to the communication object 3010. In a process 3710, the third user 210 may accept (Y-path) or reject (N-Path) to introduce the second user 200 to communication object 3010. The outcome of process 3710 can be calculated as a function of two different communication scores 3500: the communication score 3500 between first user 100 and the second user 210 on the one hand; and the communication score 3500 between second user 200 and the third user 210 on the other hand. I.e. the third user 210 therefore can act as a "door opener" (or referrer or enabler or link or guarantor) to enable communication between the first user 100 and the second user 200, which otherwise could not take place. It may be advantageous that the third user 210 can be also connected with the first node 100 either directly or indirectly. Upon acceptation, the second user 200 may be provided with the option to request consent 3600 from the first user 100. Otherwise, the communication process terminates at End process 3999.

In some embodiments, the processing device 30 (see FIG. 1a) can be configured to carry out at least one of the above processes discussed in correspondence to FIG. 4a. That is, at least one of the communication searching process 3210, communication score calculation process 3300, any of communication score evaluation processes 3510, 3520 and 3530, process 3700, process 3710, consent request process 3600 and/or consent evaluation process 3610.

Further, in some embodiments, the system accessing component 10 (see FIG. 1) can facilitate at least one of the above processes discussed in correspondence to FIG. 4a, preferably, the generation of a communication object 3010 by user 100, the input of communication conditions 3011 (that can comprise description of the object 3010) by user 100, the input of communication thresholds 3012 by the first user 100 and/or the input of communication searching criteria 2020 by the second user 200. Said data provided by the first node 100 and/or second node 200 (e.g. 3010, 3011, 3012 and/or 2020) can be transmitted by the system accessing component 10 to the processing device 30, which can store some of them, preferably the communication object 3010, communication conditions 3011 and communication thresholds 3012 to a communication system database 3100.

In the embodiment of FIG. 4a, the communication object 3010 (that can be created by the first user 100) can be provided to a second user 200, upon triggering a searching process 3210 that can be initiated by the second user 200 by providing communication searching criteria 2020. However, in some embodiments the communication object 3010 can be provided (i.e. pushed) to a node of the communication system 1, without the node searching for a communication object 3010. That is, a communication object 3010 can be automatically provided to a node of the communication system 1.

FIG. 4b illustrates an embodiment wherein the communication system 1 can be configured to automatically provide a communication object 3010 to at least one further node of the communication system 1.

As discussed with respect to FIG. 4a, a first node 100 (e.g. facilitated by a system accessing component 10, see FIG.

1a) may create a communication object 3010. The communication object can comprise communication conditions 3011 and communication thresholds 3012. The communication conditions 3011 can comprise descriptions of the communication object 3010 and conditions (e.g. price parameters) that can specify how the communication 3010 can be carried out. The communication thresholds 3012 which can be set and/or adjusted either by the first node 100 or automatically by the communication system 1 (i.e. by the processing device 30, see FIG. 1a) can be configured to allow selection of a set of communication conditions 3011, such as, to which other nodes the communication 3010 can be provided and/or which other nodes can interact with communication 3010.

The communication object 3010 can be stored in the communication system database 3100.

In a step P1, the communication score 3500 between the first node 100 and at least one other node can be calculated. In some embodiments, the processing device 30 can be configured to calculate the communication score 3500 between the first node 100 and at least one other node. In some embodiments, only nodes of the communication system 1 that comprise a direct (i.e. level one) connection (see FIGS. 2a to 3b) can be considered in step P1. Alternatively, level 1 and level 2 connections can be considered in step P1. In some embodiments, it is the user 100 that can specify which other nodes (e.g. which level connections) can be considered in step P1—e.g. through the provision or adjustment of communication thresholds 3012. In some embodiments, it is the communication system 1 (i.e. the processing device 30, see FIG. 1a) that can specify which other nodes (e.g. which level connections) can be considered in step P1—e.g. through the setting or adjustment of communication thresholds 3012 for communication 3010.

In a step P2, the communication score 3500 between the first user 100 and at least one further node of the communication system 1 as calculated in step p1, can be compared with at least one communication threshold 3012. For example, the comparison in step P2 can be carried out in a similar manner to communication score evaluation processes 3510, 3520 and 3530.

In a step P3, based on the comparison of step P2, it can be determined whether to provide the communication 3010 to the at least one other node. If the communication score 3500 indicates a high proximity between the first user 100 and at least one other user (as determined in step P2) the communication object 3010 can be made visible to that other user in step P3 according to specific communication conditions 3011 (which can also be selected based on the comparison in step P2).

FIG. 4c depicts a further illustration of establishing a communication 3010 between a first node A and a second node B.

In a step 3210A, 3300A the category of node B against node A is checked. That is, a node may be provided with the option of categorizing its connections. For example, a node may blacklist some users—that is, the node may block one or any communication with some users. A node may also whitelist some users—that is, allow one or any communication to take place directly, independently of communication score 3500 between them. A node may also categorize user according to other categories which are not depicted and discussed for sake of brevity.

Thus, in step 3210A, 3300A it is checked if user A has categorized or not user B. If node B is blacklisted by node A, the communication cannot take place between node A and B and the process terminated 3999. If node B is whitelisted by node A, the communication can directly take place (i.e. process 3900) between the nodes without the need of utilizing the communication score 3500.

If otherwise node A has not provided any classification of node B, then the communication score 3500 between nodes A and B can be used to determine whether the communication can take place between the nodes and the conditions that this communication can take place.

The categorization of node B by node A may be checked during the search process 3210 (see FIG. 4a). Alternatively, it can be checked at the start of the communication score calculation process 3300.

In step 3300, followed if no categorization of node B from node A is performed, the communication score between nodes A and B can be calculated. The calculation of communication score 3500 is discussed in more detail with respect to FIG. 5.

After communication score 3500 is calculated, its value is compared with at least one threshold in at least one communication score evaluation processes 3510, 3520, 3530. If one communication threshold 3512 (see FIG. 4a) is provided then one communication score evaluation processes can be performed, otherwise depending on the number of provided communication thresholds 3512 as many communication score evaluation processes can be carried out. The communication score evaluation processes, based on the value of communication score 3500 and the threshold(s) can determine that the communication may not take place between nodes A and B, hence followed by End process 3999. Alternatively, the communication score evaluation processes can determine that the communication can take place between node A and B and can further select a set of communication conditions 3011 (see FIG. 4a) on how the communication 3010 can take place between node A and node B. Further, as discussed in FIG. 4a, restriction (e.g. on processes 3600, 3700) may be imposed to node B—which restrictions may or may not be overcome.

Figure 5:
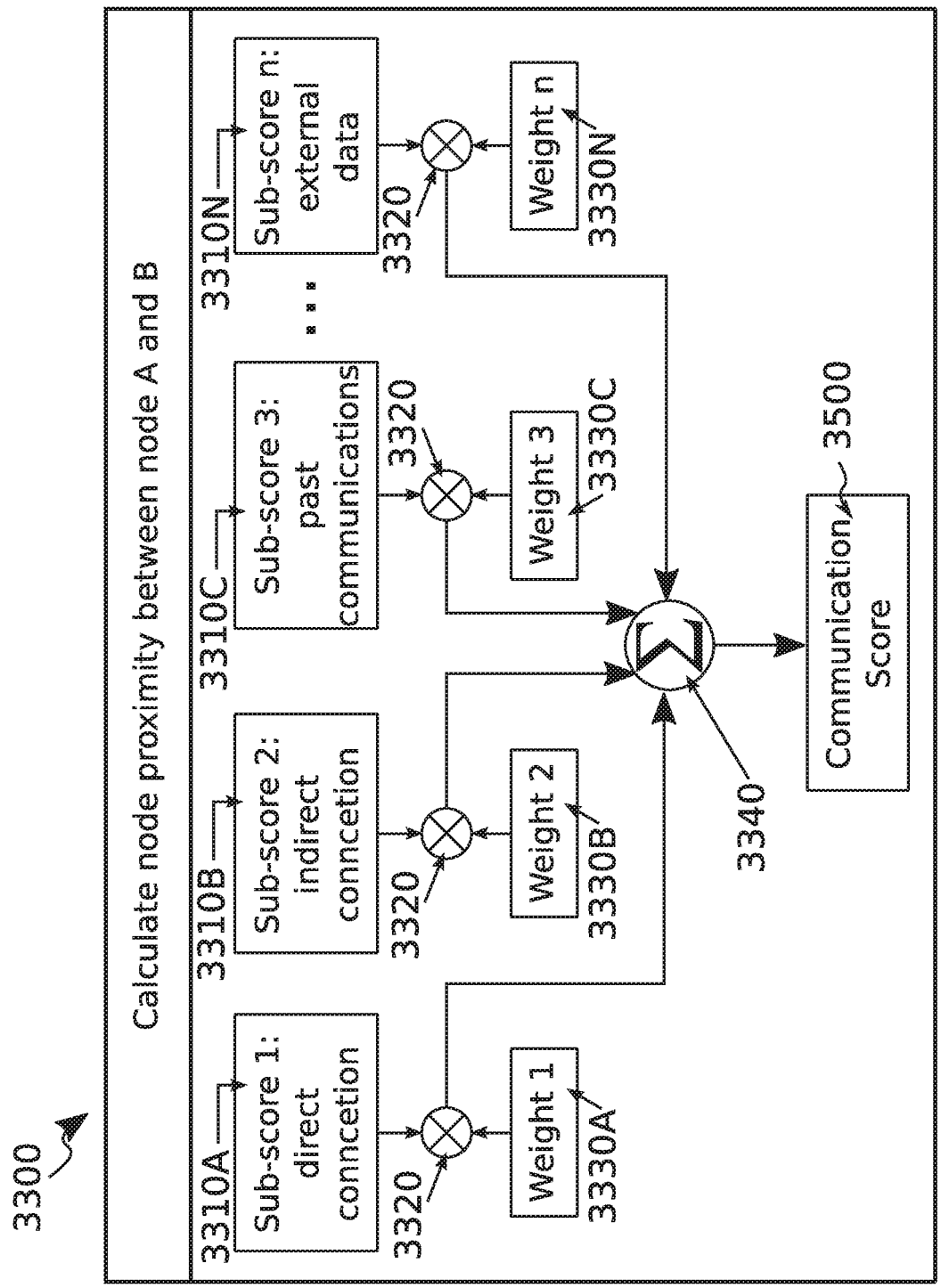
FIG. 5 depicts a diagram of calculating a communication score between a first node and a second node.

FIG. 5 depicts a more detailed diagram of communication score calculation process 3300. The communication score calculation process 3300 can be configured to calculate the communication score 3500 between two nodes, referred herein as node A and node B. For example, node A can be the first node 100 and node B can be the second node 200 for a communication object 3010 for which the communication score 3500 is being calculated.

The communication score 3500 can be calculated based on at least one sub-score 3310. The at least one sub-score 3310 may be a parameter comprised in the communication system database 3100 (see FIG. 1a) or may be imported from an external database 3200 (see FIG. 4a). Further, the at least one sub-score 3310 may be weighted with a respective weighting parameter 3330. The at least one weighting parameter 3330 can be set/adjusted manually by the first user A or can be set/adjusted automatically by the communication system 1 (e.g. by the processing device 30, see FIG. 1a). The weighting parameters 3330 can adjust the influence of the respective sub-score 3310 on the communication score 3500, i.e. some sub-scores may have a higher effect on the communication score 3500 than the others.

Each sub-score 3310 can be multiplied with the respective weighting parameter 3330 and the result can be accumulated in summation process 3340. The summation process 3340 can output the value of the communication score 3500.

A first sub-score 3310A can be obtained by the direct connection between nodes A and B, more particularly by the node proximity 60 (see FIGS. 1c-IV, 3b and 3c). For example, if a direct connection between nodes A and B exist the sub-score 3310A can comprise a value of 1 otherwise a value of 0. In yet another example, wherein the connections between members are assigned a node proximity 60, the respective node proximity 60 of the connection between A and B can be used as the sub-score 3310A.

The sub-score 3310A can be obtained from a network of members 2 (see FIGS. 1c to 3c) that can be comprised in the communication system database 3100.

A second sub-score 3310B can be obtained by the indirect connections that may exist between nodes A and B. Similarly, the sub-score 3310B may be obtained from indirect connections between nodes A and B on a (previously generated) network of members 2 (see FIGS. 1c to 3b). For example, the sub-score 3310B may be a calculated node proximity 60 of a second or more level connection that may exist between node A and node B.

A third sub-score 3310C can comprise an evaluation of the history of past communications between nodes A and B. This may comprise a value of zero if no-communication previously took place between the nodes. Otherwise, a score evaluating at least one past communication between the nodes A and B can be utilized. Said score, may be generated in an evaluation process (not shown) wherein users A and B may be requested to evaluate a communication between them at the completeness of said communication. This score may be stored in the communication system database 3100 and be used by communication score calculation process 3300. Alternatively or additionally, the sub-score 3310C may depend on communication scores 3500 of previous communications between node A and B.

A further sub-score 3310N may comprise a score obtained from external data (e.g. from external database 3200, see FIG. 4a). For example, the external databases may comprise databases of other networks (e.g. LinkedIn, Facebook, Instagram and the like) and the connection (or disconnection) on such external networks is taken into account by sub-score 3310N.

Other types of sub-scores 3310 may be similarly considered while calculating the communication score 3500.

Whenever a relative term, such as "about", "substantially" or "approximately" is used in this specification, such a term should also be construed to also include the exact term. That is, e.g., "substantially straight" should be construed to also include "(exactly) straight".

Whenever steps were recited in the above or also in the appended claims, it should be noted that the order in which the steps are recited in this text may be accidental. That is, unless otherwise specified or unless clear to the skilled person, the order in which steps are recited may be accidental. That is, when the present document states, e.g., that a method comprises steps (A) and (B), this does not necessarily mean that step (A) precedes step (B), but it is also possible that step (A) is performed (at least partly) simultaneously with step (B) or that step (B) precedes step (A). Furthermore, when a step (X) is said to precede another step (Z), this does not imply that there is no step between steps (X) and (Z). That is, step (X) preceding step (Z) encompasses the situation that step (X) is performed directly before step (Z), but also the situation that (X) is performed before one or more steps (Y1), . . . , followed by step (Z). Corresponding considerations apply when terms like "after" or "before" are used.

The invention claimed is:

1. System for communication between two nodes, wherein the nodes comprise at least a first node, a second node, and a plurality of third nodes:

a first system accessing component, operatively connected to a processing device via a first data connection, that is configured to generate, for the first node, first node data, wherein the first node data comprises:
 first node identification data; and
 first node network data comprising a node proximity with each of at least one third node that is directly connected with the first node;
a second system accessing component, operatively connected to the processing device via a second data connection, that is configured to generate for the second node, second node data, wherein the second node data comprises:
 second node identification data; and
 second node network data comprising a node proximity with at least one third node of the plurality of third nodes that is directly connected with the second node;
a database, operatively connected to the processing device via a third data connection, configured to receive and store:
 the first node data associated with the first node,
 the second node data associated with the second node, and
 third node data associated with each of the at least one third node of the plurality of third nodes, wherein the third node data comprises:
 third node identification data; and
 third node network data comprising at least one node proximity of each respective third node of the plurality of third nodes with at least one further node of the system directly connected to the respective third node;
the processing device, which is configured to access the database and calculate a node proximity between each of the nodes by considering the first node data, the second node data and the third node data;
wherein the system is configured upon triggering by the first node to generate a communication object, comprising:
 at least one communication condition; and
 at least one communication threshold;
wherein the processing device is configured to calculate a communication score for the communication object based on the node proximity between the first node and the second node;
wherein the system is configured to communicate or make accessible the communication object to the second node based on the communication score between the first node and the second node and the at least one communication threshold of the communication object; and
wherein the communication score is relational to express a node's relation with other nodes for a specific communication, such that a communication score A between the first node and a node A is different from a communication score B between the first node and a node B.

2. The system according to claim 1, wherein the node proximity is a number that represents the proximity between two nodes.

3. The system according to claim 1, wherein the system is configured to push the at least one communication object created by the first node to the at least one second node based on a comparison of the communication score between the first node and the second node and the at least one communication threshold of the communication object.

4. The system according to claim 1, wherein the processing device comprises one of a remote server and a cloud component.

5. The system according to claim 1, wherein further nodes and node data are fed into the system from at least one data base.

6. The system according to claim 1, wherein the communication score is calculated based on the node proximity of at least one indirect connection between the two nodes for which the communication score is being calculated, said node proximity of the indirect connection being calculated by the data processing device based on the node proximity of the direct connections comprised in the node network data of the respective nodes.

7. The system according to claim 1, wherein the processing device is configured to determine a second level connection between the first node and the second node if there exists at least one common node of the set of at least one third node directly connected to both the first node and the second node, and the processing device is configured to calculate the node proximity of the second level connection between the first node and the second node based on the node proximities of the first node and second node with the common third node and, if there exists multiple third nodes directly connected to both the first node and the second node, select a node of the multiple third nodes directly connected to both the first node and the second node that yields the node proximity indicating the highest proximity between the first node and the second node.

8. The system according to claim 1, wherein the system is configured to provide one of a rental offer and a purchasing offer of the first node to the second node according to the communication score between the first node and the second node.

9. The system according to claim 1, wherein the system is configured to provide one of a rental offer and a purchasing offer of the first node to the second node according to the communication score between the first node and the second node and wherein the communication conditions comprise one of prices, priorities, and services levels as a function of the communication score.

10. The system according to claim 1, wherein the system is configured to provide one of a rental offer and a purchasing offer of the first node to the second node according to the communication score between the first node and the second node and wherein the communication conditions comprise self-adjustment of prices on the basis of time, so that with progression of time, the pricing decreases.

11. The system according to claim 1, wherein the system is configured to provide one of a rental offer and a purchasing offer of the first node to the second node according to the communication score between the first node and the second node and wherein the communication conditions comprise self-adjustment of one of prices, priorities, and services levels as a function of the past behavior of nodes.

12. The system according to claim 1, wherein different direct connections are ranked or differentiated based on the node proximity.

13. The system according to claim 1, wherein the communication score is an asymmetric metric.

14. A method for communication between nodes, wherein the nodes comprise at least a first node, a second node, and a plurality of third nodes, comprising:
generating, for a first node, first node data, wherein the first node data comprises:
first node identification data; and
first node network data comprising a node proximity with each of a set of at least one third node that is directly connected with the first node;
generating, for a second node, second node data, wherein the second node data comprises:
second node identification data and
second node network data comprising a node proximity with each of at least one third node that is directly connected with the second node; and
receiving and storing the first node data associated with the first node, the second node data associated with the second node, and third node data associated with each of the at least one third node that is directly connected with the first node and/or the second node at a database, wherein the third node data comprises
third node identification data; and
third node network data comprising at least one node proximity of each respective third node with at least one further node directly connected to the respective third node;
accessing the database via a processing device to calculate a node proximity between each of the nodes from the first node data, the second node data, and the third node data;
triggering the generation of at least one communication object associated to the first node, each communication object comprising:
at least one communication condition; and
at least one communication threshold;
calculating a communication score for the communication object based on the node proximity between the first node and the second node; and
communicating the communication object to the second node based on the communication score between the first node and the second node and the at least one communication threshold of the communication object;
wherein the communication score is relational to express a node's relation with other nodes for a specific communication, such that a communication score A between the first node and a node A is different from a communication score B between the first node and a node B.

15. The method according claim 14, further comprising pushing the communication object of the first node to the second node according to the communication score between the first node and the second node calculated for the communication object.

16. The method according to claim 14, further comprising the step of assigning the nodes to parties.

17. The method according to claim 14, wherein the communication object comprises data of goods and services to let by a node referred as a first node and further preferably a time when to let the goods and services.

18. The method according to claim 14, further comprising the step of distinguishing between different levels of proximity between nodes.

19. The method according to claim 14, further comprising the step of assigning the node proximities to attributes that describe social proximity or trust.

20. The method according to claim 14, further comprising the step of providing one of a rental offer and a purchasing offer of the first node to the nodes according to the communication score between the first node and the nodes and wherein the communication conditions comprise self-adjustment prices on the basis of time, so that with and progression of time the pricing decreases by preset values.

21. The method according to claim 14, further comprising the step of providing a purchasing offer of the first node to the second node according to the communication score between the first node and the second node and wherein the communication conditions comprise self-adjustment of one of prices, priorities, and services levels as a function of the past behavior of nodes.

22. The method according to claim 14, wherein different direct connections are ranked or differentiated based on the node proximity.

23. The method according to claim 14, wherein the communication score is an asymmetric metric.

* * * * *